US010587703B2

(12) United States Patent
Feijoo et al.

(10) Patent No.: US 10,587,703 B2
(45) Date of Patent: Mar. 10, 2020

(54) PROVIDING COMMUNICATION CONNECTIVITY BETWEEN DISPARATE NETWORK ENTITIES LOCATED IN ISOLATED COMMUNICATION NETWORKS THROUGH A CENTRALIZED CLOUD SERVICE

(71) Applicant: Citrix Systems, Inc., Fort Lauderdale, FL (US)

(72) Inventors: Ricardo Fernando Feijoo, Davie, FL (US); Kenneth Bell, Sunnyvale, CA (US); Mark Howell, Charlotte, NC (US); Manbir Chauhan, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 99 days.

(21) Appl. No.: 15/875,730

(22) Filed: Jan. 19, 2018

(65) Prior Publication Data
US 2019/0058768 A1 Feb. 21, 2019

Related U.S. Application Data

(60) Provisional application No. 62/547,176, filed on Aug. 18, 2017.

(51) Int. Cl.
*G06F 15/173* (2006.01)
*H04L 29/08* (2006.01)
(Continued)

(52) U.S. Cl.
CPC .......... *H04L 67/16* (2013.01); *H04L 12/4633* (2013.01); *H04L 67/1002* (2013.01); *H04L 67/2814* (2013.01); *H04L 69/04* (2013.01)

(58) Field of Classification Search
CPC . H04L 12/4633; H04L 67/1002; H04L 67/16; H04L 69/04
See application file for complete search history.

(56) References Cited

U.S. PATENT DOCUMENTS 6,665,304 B2 * 12/2003 Beck ...................... H04L 45/00
370/401
9,503,277 B2 11/2016 Dong et al.
(Continued)

OTHER PUBLICATIONS

Welch. Terry A., "A Technique for High-Performance Data Compression," IEEE, Computer, vol. 17, Issue: 6, Jun. 1984, pp. 8-19.
(Continued)

*Primary Examiner* — Davoud A Zand
*Assistant Examiner* — Dixon F Dabipi
(74) *Attorney, Agent, or Firm* — BainwoodHuang

(57) ABSTRACT

Technology for providing communication connectivity between network entities located in different isolated communication networks through a centralized cloud service. A cloud service connector in a source communication network receives an initial connection request from a source end point device in the source communication network, and determines a customer name and requested service associated with the port number indicated in the request. Mappings are established between the source end point device and a destination end point device that provides the requested service from within a destination communication network that is associated with the customer name. Network traffic is conveyed between the source end point device and the destination end point device through the cloud service by tunneling packets over connections between the cloud service connector in the source communication network and the cloud service and between a cloud service connector in the destination communication network and the cloud service.

17 Claims, 8 Drawing Sheets

(51) Int. Cl.
    *H04L 29/06*    (2006.01)
    *H04L 12/46*    (2006.01)

(56)         References Cited

U.S. PATENT DOCUMENTS 9,646,649  B2     5/2017   Sugawara et al.
    9,710,599  B1     7/2017   Johnson et al.
    9,727,384  B2 *   8/2017   Zarkesh ................. H04L 69/04
    9,736,273  B2     8/2017   Savolainen et al.
    9,781,189  B2    10/2017   Verzano
    9,825,914  B2    11/2017   Sau et al.
 2006/0277596  A1 *  12/2006   Calvert ............... H04L 63/0218
                                                                 726/3
 2010/0217982  A1     8/2010   Brown
 2015/0052525  A1 *   2/2015   Raghu .................... G06F 9/455
                                                                 718/1
 2015/0281355  A1 *  10/2015   Maturana ............ H04L 67/1097
                                                                709/202
 2016/0330177  A1 *  11/2016   Singleton, IV ..... H04L 63/0435

OTHER PUBLICATIONS

"Digital Imaging and Communications in Medicine (DICOM) Part 1: Introduction and Overview," DICOM Standard, PS 3.1-2001, National Electrical Manufacturer's Association, Rosslyn, Virginia, USA, 2001, 18 pages.

* cited by examiner

PROVIDING COMMUNICATION CONNECTIVITY BETWEEN DISPARATE NETWORK ENTITIES LOCATED IN ISOLATED COMMUNICATION NETWORKS THROUGH A CENTRALIZED CLOUD SERVICE

TECHNICAL FIELD

The present disclosure relates generally to the technical field of networked computer systems, and more specifically to providing communication connectivity between disparate network entities located in isolated communication networks through a centralized cloud service.

BACKGROUND

In many operational environments, it is desirable to isolate network traffic conveyed on one communication network from network traffic conveyed on another communication network. For example, network traffic conveyed on a first communication network may need to be isolated from network traffic conveyed on a second communication network because the first communication network is private, and the second communication network is public. In another example, network traffic may need to be isolated in two communication networks that are both private. In another example, network traffic conveyed on one communication network may need to be isolated from network traffic conveyed on another communication network because the address space used to identify devices located within the first communication network may overlap with the address space used to identify devices located within the second communication network, e.g. the network addresses (e.g. Internet Protocol (IP) addresses) assigned to the devices located within a given communication network may be guaranteed to be unique only within that communication network, resulting in the possibility that a single network address may be assigned to both a first device located in a first communication network, and also to a second device located in the second communication network.

Technologies for isolating a communication network have included firewall network security systems ("firewalls") that monitor and control incoming and outgoing network traffic for an isolated communication network, according to packet filtering rules associated with the isolated communication network. Such packet filtering rules may indicate which packets are allowed into the isolated communication network through the firewall, as well as which packets are allowed out of the isolated communication network through the firewall, based on information within the headers of individual packets. Packet header information used by a firewall to perform packet filtering may include the source and/or destination network address (e.g. IP address), communication protocol, and/or source and/or destination port number indicated in the packet header. Firewalls may also include network address translation (NAT) functionality, which allows devices located on an isolated communication network that is protected by the firewall to be assigned network addresses that are guaranteed to be unique only within the isolated communication network.

In certain circumstances, devices that are located within different isolated communication networks must operate together as if they are located within a single communication network. Such circumstances may arise, for example, when a communication protocol that was originally designed for use within a single communication network must be used for communications between devices that are located in multiple isolated communication networks. One example of a protocol that was originally designed for use within a single communication network is described in the Digital Imaging and Communications in Medicine (DICOM) standard. DICOM is a standard for communication and management of medical imaging and related data. DICOM enables interoperability between different types of medical imaging equipment by specifying a set of protocols that are to be followed by devices such as scanners, servers, workstations, printers, and/or picture archiving and communication systems (PACS). When the DICOM standard was first developed, devices that communicated using DICOM were typically located within a single communication network. For example, devices using the DICOM protocol to communicate with each other were likely to all be located within a single facility, such as a hospital. Accordingly, the DICOM standard assumes that communicating devices are located within a single communication network. In DICOM, an Application Entity is a system or program running on a system which is the end-point of DICOM communications. According to the DICOM standard, each DICOM Application Entity is identified by a locally unique Application Entity Title. Over time, the operational contexts in which DICOM conformant devices are used have become increasingly distributed, both in terms of geographic scope and organizational diversity. The devices that are used to obtain, store and view medical images, and that need to communicate medical images with each other using the communication protocols defined in the DICOM standard, are now often located in multiple geographically distinct facilities (e.g. separate hospitals and/or clinics), each of which i) has its own isolated (e.g. private) communication network, and ii) operates independently under the control of its own system administration team.

SUMMARY

Technology is described herein for providing communication connectivity between network devices located in multiple isolated communication networks through a centralized cloud service. A cloud service connector component located in a source communication network, such as a virtual machine executing on a server computer located in the source communication network, is operable to receive an initial connection request message from at least one source end point device that is also located within the source communication network. The initial connection request message requests a connection (e.g. a TCP connection) on a port number that is contained in the initial connection request. The cloud service connector located in the source communication network is separate and independent from the source end point device, e.g. the cloud service connector in the source communication network is physically separate from and operates independently from the source end point device.

In response to receipt of the initial connection request message from the source end point device, and to the port number contained in the initial connection request message, the cloud service connector in the source communication network operates by retrieving i) a name of a customer of a cloud service that executes on at least one server computer located in a public communication network that is communicably connected to the source communication network, and ii) an indication (e.g. a name) of a requested service. The retrieved customer name and indication of the requested service each correspond to the port number contained in the initial connection request, and may be retrieved by the cloud service connector located in the source communication network from one or more customer and service lookup tables maintained within the cloud service connector located in the source communication network using the port number contained in the initial connection request message.

The cloud service connector located in the source communication network further operates by creating a tunnel connection request message using the retrieved customer name and requested service. The tunnel connection request message contains the retrieved customer name and the indication of the requested service.

The cloud service connector located in the source communication network further transmits the tunnel connection request message to the cloud service, e.g. over the public communication network through a firewall device that isolates network traffic conveyed on the source communication network from network traffic conveyed on the public communication network.

The cloud service operates to receive the tunnel connection request message from the cloud service connector located in the source communication network, and to extract the customer name and the indication of the requested service from the tunnel connection request message. In response to receipt of the tunnel connection request message, and to the customer name and the indication of the requested service extracted from the tunnel connection request message, the cloud service retrieves i) an identifier of a cloud service connector located in a destination communication network that corresponds to the customer name, and ii) an identifier of a destination end point device located in the destination communication network that provides the requested service. The destination communication network is communicably connected to the public communication network, e.g. through a firewall device that isolates network traffic conveyed on the destination communication network from network traffic on the public communication network. The destination communication network is not communicably connected to the source communication network.

The cloud service further operates in response to receipt of the tunnel connection request message from the cloud service client and to the identifier of the destination communication network and the identifier of the destination end point device, to convey network traffic between the source end point device and the destination end point device through the cloud service by tunneling packets over connections (e.g. TCP connections) i) between the cloud service connector located in the source communication network and the cloud service, and ii) between the cloud service connector located in the destination communication network and the cloud service.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different views. The elements of the drawings are not necessarily drawn to scale, emphasis instead being placed upon illustrating the principles of the various embodiments.

DETAILED DESCRIPTION

Figure 1:
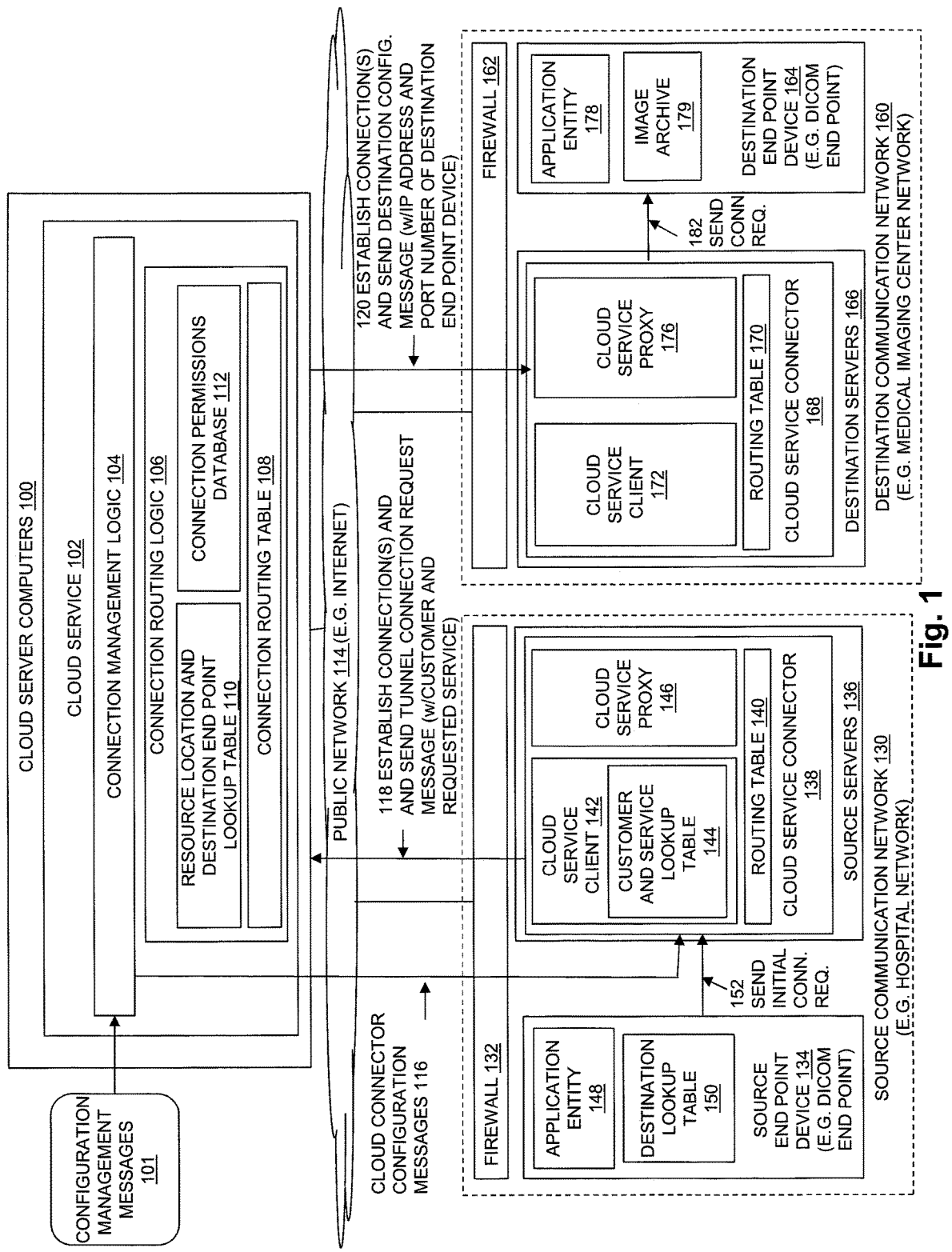
FIG. 1 is a block diagram showing an example of components in some embodiments.

Embodiments will now be described with reference to the figures. Such embodiments are provided only by way of example to and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variants except to the extent that such combinations, permutations and/or variants have been expressly excluded herein and/or are technically impractical. Support for all such combinations, permutations and/or variants is considered to exist in this document.

Previous approaches to enabling devices located within different isolated communication networks to communicate with each other as if they were located within a single communication network have exhibited significant shortcomings. For example, some previous approaches have established and maintained Virtual Private Networks (VPNs) that interconnect multiple isolated communication networks containing the devices that must communicate with each other. Unfortunately, as the number of interconnected isolated communication networks increases, the complexity of setting up and maintaining VPNs to interconnect them also increases. The burden of setting up and maintaining VPNs is especially costly in operational environments that experience high rates of network topology change, and in which the overall network topology is large and complex.

For example, various types of medical imaging equipment may be owned by and located within a large hospital, and may use the DICOM protocol to communicate over an isolated communication network that is physically contained within the hospital, and that is under the direct administrative control of the hospital. Such devices may also need to communicate using the DICOM protocol with medical imaging equipment that is located in multiple remote medical imaging centers, each of which have their own isolated communication network. In addition, the hospital may continuously enter into relationships with new medical imaging centers, while also ending previously established relationships with other medical imaging centers. In such circumstances, the network of VPNs that interconnect the isolated networks belonging to the hospital and to the related medical imaging centers with whom the hospital has active relationships is likely to be both i) large and complicated, and ii) frequently changing. This type of operating environment generally results in high VPN set up and maintenance costs.

In addition, setting up VPNs that exchange network traffic between the hospital's private network and each of the communication networks of the remote medical imaging centers associated with the hospital exposes the hospital's private network to cyber-attacks whenever a successful attack occurs on any one of the communication networks of the medical imaging centers.

Further, since each one of the isolated communication networks may assign network addresses to the devices it contains from within its own private network address space, the network address spaces of the interconnected networks may overlap, causing the same network address to be assigned to different devices located in different networks. To prevent network address confusion between the different networks, comprehensive network address translation (NAT) functionality may be required, e.g. within firewall devices through which the VPN traffic passes at the edge of each isolated network.

Similar issues of network interconnection complexity and change management, as well as security concerns, may arise in other specific types of operational environments. For example, as increasing numbers of physical devices such as vehicles, home appliances and other types of physical devices become embedded with software, sensors, actuators, and network connectivity, such Internet of Things (IoT) devices also need to securely communicate with each other across complicated and frequently changing configurations of interconnected isolated communication networks.

To address the above described and other shortcomings arising in previous technologies, new technology is described herein for providing communication connectivity between network devices located in different isolated communication networks through a centralized cloud service. In the disclosed technology, a cloud service connector located in a source communication network receives an initial connection request from a source end point device also located in the source communication network, and determines a customer name and requested service associated with the port number indicated in the request. Mappings are established between the source end point device and a destination end point device that provides the requested service within a destination communication network associated with the customer name. Network packets are then conveyed between the source end point device and the destination end point device through the cloud service, by tunneling the packets through at least one connection, e.g. a Transmission Control Protocol (TCP) connection, between the cloud service connector located in the source communication network and the cloud service, and through at least one connection (e.g. TCP connection) between a cloud service connector located in the destination communication network and the cloud service.

Embodiments of the technology described herein may provide significant advantages over previous technologies that were used to enable communication between devices located in different isolated communication networks. For example, the technology disclosed herein may be embodied to provide communication between individual devices located in different isolated communication networks without the high set up and maintenance costs that arise in previous solutions that interconnected isolated communication networks using VPNs, especially in operational environments that are i) large and complicated, and ii) frequently changing. In addition, the technology described herein may be embodied to centrally enforce specific security policies provided by the organizations that the communicating devices contained in the isolated communication networks belong to, without exposing the various isolated communication networks to attack when the security of another one of the communication networks becomes compromised. Embodiments of the disclosed technology may also remove the need for NAT technology at the edge of each isolated communication network when the network address spaces of the interconnected networks overlap.

FIG. 1 is a block diagram showing an example of components in some embodiments. A Source Communication Network 130 is shown containing at least one Source End Point Device 134 and some number of Source Servers 136. For purposes of explanation, Source Communication Network 130 may, for example, be a private network that is physically located within, owned by, and/or under the administrative control of a hospital. Source Communication Network 130 may, for example, consist of or include one or more Local Area Networks (LANs).

In some embodiments, the Source End Point Device 134 may include or consist of a device that is an end point for DICOM communications, such as a scanner, server, workstation, printer, and/or picture archiving and communication system (PACS). Source End Point Device 134 may include a DICOM Application Entity, shown by Application Entity 148. Application Entity 148 is a functional component in Source End Point Device 134, and is a consumer and/or provider of one or more DICOM services, such as medical image archiving and/or medical image retrieval. Application Entity 148 corresponds to an Application Entity Title that identifies the Application Entity. Using the technology disclosed herein, Application Entity 148 may have a corresponding Application Entity Title that can be used to locate and access Application Entity 148, by other Application Entities that are located within both Source Communication Network 130 and within Destination Communication Network 130. Application Entity 148 may include or consist of some combination of hardware, firmware, and/or software logic. For example, Application Entity 148 may include or consist of program code (e.g. instructions) stored in a memory of Source End Point Device 134, for execution on processing circuitry of Source End Point Device 134 (e.g. one or more microprocessors within Source End Point Device 134). A memory within Source End Point Device 134 may also be used to store Destination Lookup Table 150. Source End Point Device 134 may further include one or more communication interfaces through which Source End Point Device 134 is communicably connected to Source Communication Network 130, such as, for example, one or more Network Interface Controllers (NICs) or the like.

In some embodiments, Source Servers 136 may include or consist of one or more server computers, each of which has memory for storing program code (e.g. instructions) for execution on processing circuitry (e.g. one or more microprocessors or the like) contained within the Source Servers 136. The memory of Source Servers 136 may, for example, store one or more cloud service connector virtual machines, including the Cloud Service Connector 138, which execute on the processing circuitry of Source Servers 136. Cloud Service Connector 138 may itself execute a set of programs that may include Cloud Service Client 142 and Cloud Service Proxy 146. Cloud Service Client 142 may include Customer and Service Lookup Table 144. Cloud Service Connector 138 may also include Routing Table 140. Source Servers 136 may further include one or more communication interfaces through which Source Servers 136 are communicably connected to Source Communication Network 130, such as, for example, one or more Network Interface Controllers (NICs) or the like.

Source Communication Network 130 is communicably connected to Public Network 114, e.g. through Firewall 132. Public Network 114 may include or consist of any specific type of public network, such as the Internet. Firewall 132 may be embodied as a device that uses packet filtering technology to isolate network traffic on Source Communication Network 130 from network traffic on Public Network 114, e.g. by monitoring and controlling the forwarding of packets received from Public Network 114 and from Source Communication Network 130. For example, packets received by Firewall 132 from Public Network 114 that are allowed to pass through Firewall 132 to Source Communication Network 130, and packets received by Firewall 132 from Source Communication Network 130 that are allowed to pass through Firewall 132 to Public Network 114 may be defined by packet filtering rules associated with the Source Communication Network 130, e.g. that are loaded into the Firewall 132 by a network administrator of a hospital that owns Source Communication Network 130 and in which Source Communication Network 130 is physically located. For example, packet filtering rules used to isolate Source Communication Network 130 may indicate which packets received by Firewall 132 are allowed to pass through Firewall 132 based on the values contained in the header fields of the packets, such as source and/or destination network address (e.g. IP address), communication protocol, and/or source and/or destination port number values.

As further shown in FIG. 1, Cloud Server Computers 100 are located in the Public Network 114. In some embodiments, Cloud Server Computers 100 may include or consist of one or more server computers that are owned and managed by a cloud services provider business entity or organization. The cloud services provider may be separate and independent from the entity or entities that own and/or control the Source Communication Network 130 and/or Destination Communication Network 160 and the various devices contained therein. For purposes of explanation, Cloud Server Computers 100 may be owned and managed by a cloud services provider that is separate and independent from the hospital that owns and manages Source Communication Network 130, and that is also separate and independent from a medical imaging center that owns and manages Destination Communication Network 160. In some embodiments, the entities that own and manage the Source Communication Network 130 and Destination Communication Network 160 may each be customers of the cloud services provider that owns and manages the Cloud Server Computers 100.

Cloud Server Computers 100 may include or consist of one or more physical server computers, each of which includes memory for storing program code (e.g. instructions) for execution on processing circuitry (e.g. one or more microprocessors or the like) that is also contained within the Cloud Server Computers 100. Such program code may include the Cloud Service 102, which is shown including Connection Management Logic 104 and Connection Routing Logic 106. Connection Routing Logic 106 may include Resource Location and Destination End Point Lookup Table 110, Connection Permissions Database 112, and Connection Routing Table 108. Cloud Server Computers 100 may further include one or more communication interfaces through which Cloud Server Computers 100 are communicably connected to Public Network 114, such as, for example, one or more Network Interface Controllers (NICs) or the like.

Destination Communication Network 160 is shown containing at least one Destination End Point Device 164 and some number of Destination Servers 166. For purposes of explanation, Destination Communication Network 160 may, for example, be a private network that is physically located within, owned by, and/or under the administrative control of a medical imaging center. Destination Communication Network 160 may, for example, consist of or include one or more Local Area Networks (LANs).

In some embodiments, the Destination End Point Device 164 may include or consist of a device that is an end point for DICOM communications, such as a scanner, server, workstation, printer, and/or picture archiving and communication system (PACS). Destination End Point Device 164 may include a DICOM Application Entity, shown by Application Entity 178. Application Entity 178 is a functional component in Destination End Point Device 164, and is a consumer and/or provider of one or more DICOM services, such as medical image archiving and/or medical image retrieval. Using the technology disclosed herein, Application Entity 178 may have a corresponding Application Entity Title that can be used to locate and access Application Entity 178 by other Application Entities located in both Source Communication Network 130 and Destination Communication Network 160. Application Entity 178 may include or consist of some combination of hardware, firmware, and/or software logic. For example, Application Entity 178 may include or consist of program code (e.g. instructions) stored in a memory of Destination End Point Device 164, and executable on processing circuitry of Destination End Point Device 164 (e.g. one or more microprocessors within Destination End Point Device 164). Destination End Point Device 164 may further include one or more communication interfaces through which Destination End Point Device 164 is communicably connected to Destination Communication Network 160, such as, for example, one or more Network Interface Controllers (NICs) or the like.

In some embodiments, Destination Servers 166 may include or consist of one or more server computers, each of which includes memory for storing program code (e.g. instructions) that is executable on processing circuitry (e.g. one or more microprocessors or the like) also contained within the Destination Servers 166. The memory of Destination Servers 166 may, for example, store one or more cloud service connector virtual machines, including the Cloud Service Connector 168, which execute on the processing circuitry of Destination Servers 166. Cloud Service Connector 168 may itself execute a set of programs that may include Cloud Service Client 172 and Cloud Service Proxy 176. Cloud Service Connector 168 may also include Routing Table 170. Destination Servers 166 may further include one or more communication interfaces through which Destination Servers 166 are communicably connected to Destination Communication Network 160, such as, for example, one or more Network Interface Controllers (NICs) or the like.

Destination Communication Network 160 is communicably connected to Public Network 114, e.g. through Firewall 162. Firewall 162 may be embodied as a device that uses packet filtering technology to isolate network traffic on Destination Communication Network 160 from network traffic on Public Network 114, by monitoring and controlling the forwarding of packets received from Public Network 114 and from Destination Communication Network 160. Packets received by Firewall 162 from Public Network 114 that are allowed to pass through Firewall 162 to Destination Communication Network 160, and packets received by Firewall 162 from Destination Communication Network 160 that are allowed to pass through Firewall 162 to Public Network 114 may, for example, be defined by packet filtering rules associated with the Destination Communication Network 160, e.g. as loaded into the Firewall 162 by a network administrator of a medical imaging center that owns Destination Communication Network 160 and in which Destination Communication Network 160 is located. For example, packet filtering rules used to isolate Destination Communication Network 160 may indicate which packets received by Firewall 162 are allowed to pass through Firewall 162 based on the values contained in the header fields of the packets, such as source and/or destination network address (e.g. IP address), communication protocol, and/or source and/or destination port number values. Destination Communication Network 160 is not communicably connected to Source Communication Network 130.

As it is generally known, it is advantageous to minimize the number of inbound ports that are open in a firewall, since larger numbers of open inbound ports provide attackers outside of the firewall with larger numbers of options for performing cyber-attacks on the devices that are located within the network protected by the firewall. Embodiments of the technology described herein may advantageously require that no inbound firewall ports be opened in each of Firewall 132 and Firewall 162 in order to permit communications between end point devices in Source Communication Network 130 and end point devices in Destination Communication Network 160.

During operation of the components shown in FIG. 1, Connection Management Logic 104 within Cloud Service 102 may receive Configuration Management Messages 101 from customers of the cloud services provider that owns and manages the Cloud Server Computers 100 and/or the Cloud Service 102. Each one of the customers of the cloud service provider may have a communication network that they own and operate. For example, a hospital that is a customer of the cloud services provider may own and operate Source Communication Network 130, and a medical imaging center that is another customer of the cloud services provider may own and operate Destination Communication Network 160. Each customer may provide one or more configuration management messages to Connection Management Logic 104 indicating one or more end point devices located within their communication network that are to be made available for access through Cloud Service 102 to end point devices located in the communication networks of one or more other customers.

For example, a connection management message received from a customer may include an access control list for each one of the end point devices that is located in that customer's communication network and that is to be made available for access to one or more end point devices located outside of the customer's communication network. An access control list for a given end point device may contain identifiers of other specific end point devices that are located in the private networks of other customers, and that are to be allowed to access that end point device through the Cloud Service 102. For example, an access control list received for Source End Point Device 134 may contain identifiers of one or more specific end point devices that are located in Destination Communication Network 160 (e.g. including Destination End Point Device 164) that are to be allowed by Cloud Service 102 to access Source End Point Device 134 through Cloud Service 102.

Similarly, an access control list received for Destination End Point Device 164 may contain identifiers of one or more specific end point devices that are located in Source Communication Network 130 (e.g. including Source End Point Device 134) that are to be allowed by Cloud Service 102 to access Destination End Point Device 164 through Cloud Service 102.

Connection Management Logic 104 stores the access control lists contained in the Configuration Management Messages 101 into Connection Permissions Database 112. Cloud Service 102 then determines whether to allow network traffic to be conveyed between Source End Point Device 134 and Destination End Point Device 164 using the access control lists stored in Connection Permissions Database 112. For example, Cloud Service 102 permits network traffic to be conveyed between Source End Point Device 134 and Destination End Point Device 164 only in response to determining that both i) the access control list for Source End Point Device 134 contains an identifier of Destination End Point Device 164, and ii) the access control list for Destination End Point Device 164 contains an identifier of Source End Point Device 134. Alternatively, Cloud Service 102 prevents network traffic from conveyed between Source End Point Device 134 and Destination End Point Device 164 in response to determining that either i) the access control list for Source End Point Device 134 does not contain an identifier of Destination End Point Device 164, or ii) the access control list for Destination End Point Device 164 does not contain an identifier of Source End Point Device 134

Connection Management Logic 104 may also configure Resource Location and Destination End Point Lookup Table 110 such that an index consisting of a customer name and an indication of a requested service can be used to retrieve an entry from the table that contains i) an identifier (e.g. IP address and/or port number) of a cloud service connector located in the communication network belonging to the customer, and an ii) identifier (e.g. IP address and/or port number) of an end point device that provides the requested service within that communication network. For example, Connection Management Logic 104 may load an entry into Resource Location and Destination End Point Lookup Table 110 that indicates (e.g. contains) an identifier (e.g. IP address and/or port number) of the Cloud Service Connector 168, as well as an identifier (e.g. IP address and/or port number) of Destination End Point Device 164 that may be used to access the service provided by Application Entity 178, such that the entry is returned in response to indexing Resource Location and Destination End Point Lookup Table 110 with an index consisting of customer name equal to the name of the medical imaging center that owns and operates Destination Communication Network 160 and a service name equal to the name of the service provided by Application Entity 178.

Connection Management Logic 104 may further operate to send Cloud Connector Configuration Messages 116 to Cloud Service Connector 138. Cloud Connector Configuration Messages 116 may indicate to Cloud Service Connector 138 the specific services that are available from devices located in Destination Communication Network 160. For example, Cloud Connector Configuration Messages 116 may indicate that the service provided by Application Entity 178 is available from an end point device (e.g. Destination End Point Device 164) that is located in the communication network that is owned and operated by the medical imaging center that owns and operates Destination Communication Network 160. In response, Cloud Service Connector 138 (e.g. Cloud Service Client 142) may add an entry to the Customer and Service Lookup Table 144 that indicates (e.g. contains) both i) the customer name for the medical imaging center that owns and operates Destination Communication Network 160, and ii) the name of the service provided by Application Entity 178, such that the entry is retrieved from Customer and Service Lookup Table 144 in response to an index equal to a specific port number that corresponds to the service provided by Application Entity 178. Cloud Service Connector 138 then begins listening for connection requests that may be received from any device in Source Communication Network 130 on the specific port number that corresponds to the service provided by Application Entity 178.

While for purposes of concise illustration only one destination end point device is shown in the example of FIG. 1, Destination Communication Network 160 may contain multiple destination end point devices, each one of which may have one or more application entities that provide a corresponding service. The Cloud Connector Configuration Messages 116 may accordingly indicate to Cloud Service Connector 138 all of the different services provided by the different application entities in destination end point devices located in the Destination Communication Network 160. For each such different service provided by a different application entity in a destination end point device that is located in the Destination Communication Network 160, Cloud Service Connector 138 (e.g. Cloud Service Client 142) may add an entry to Customer and Service Lookup Table 144 that i) is indexed by a specific port number that corresponds to that service, and that ii) indicates (e.g. contains) both a) the customer name for the medical imaging center that owns and operates Destination Communication Network 160, and b) the service name for that service. Cloud Service Connector 138 then begins listening for connection requests that may be received from any device located in Source Communication Network 130 on each one of the multiple port numbers that correspond to services provided by application entities in destination end point devices located in Destination Communication Network 160.

Connection Management Logic 104 may also transmit one or more messages to the system administrator of the hospital that owns and manages Source Communication Network 130. Such messages indicate that end point devices in Source Communication Network 130 can access the services provided by application entities in destination end point devices located in Destination Communication Network 160 through Cloud Service 102 by establishing connections with the Cloud Service Connector 138 on port numbers corresponding to individual ones of those services. For example, Connection Management Logic 104 may transmit a message to the system administrator of the hospital that owns and manages Source Communication Network 130 indicating that any end point device located in Source Communication Network 130 can access the service provided by Application Entity 178 by establishing a connection with the Cloud Service Connector 138 on the specific port number that corresponds to the service provided by Application Entity 178. In response to such a message from Connection Management Logic 104, the system administrator of the hospital configures the Destination Lookup Table 150 to include an entry that i) indicates (e.g. contains) the IP address of Cloud Service Connector 138 and the specific port number that corresponds to the service provided by Application Entity 178, and that ii) is returned when the Destination Lookup Table 150 is indexed (e.g. by Application Entity 148) using an Application Entity Title that corresponds (e.g. uniquely corresponds) to Application Entity 178.

Subsequently, when Application Entity 148 needs to access a service provided by an Application Entity that executes on one of the devices located in Destination Communication Network 160, Application Entity 148 indexes into Destination Lookup Table 150 using an Application Entity Title corresponding to that Application Entity, to obtain an IP address and port number that the Source End Point Device 134 uses to establish a connection (e.g. a TCP connection) to access the service. In response to the index made up of the Application Entity Title of the Application Entity executing in Destination Communication Network 160 that provides the desired service, Destination Lookup Table 150 returns an entry that contains the IP address of Cloud Service Connector 138, and a port number that corresponds to the service that is provided by the Application Entity in Destination Communication Network 160 that corresponds to the Application Entity Title that was used to index into Destination Lookup Table 150. Application Entity 148 then creates an initial connection request message (e.g. a TCP synchronize ("SYN") message) with destination IP address and destination port fields set equal to the IP address and port number from the entry that was retrieved from the Destination Lookup Table 150. Source End Point Device 134 then transmits the initial connection request to Cloud Service Connector 138, that requests a connection (e.g. a TCP connection) with the Cloud Service Connector 138.

In the example of FIG. 1, in a use case in which Application Entity 148 determines that it needs to access one or more medical images (e.g. computed tomography ("CT") scans) through the Application Entity 178, e.g. through a medical image retrieval service provided by Application Entity 178 that enables Application Entities in Source Communication Network 130, such as Application Entity 148, to retrieve copies of one or more medical images from an Image Archive 179 contained within Destination End Point Device 164 (e.g. a medical image retrieval service), Application Entity 148 responds to the determination that it needs to access medical images through Application Entity 178 by indexing into the Destination Lookup Table 150 using the Application Entity Title corresponding to Application Entity 178, in order to determine an IP address and port number to be used by Source End Point Device 134 to establish a connection with Application Entity 178. Application Entity 148 obtains an entry from Destination Lookup Table 150 that contains an IP address of Cloud Service Connector 138, and a port number that corresponds to the service provided by Application Entity 178. In response to the entry retrieved from Destination Lookup Table 150, Source End Point Device 134 then creates an initial connection request message (e.g. a TCP synchronize ("SYN") message) having destination IP address and destination port fields equal to the IP address and port that were contained in the entry retrieved from the Destination Lookup Table 150. As shown at reference number 152 in FIG. 1, Source End Point Device 134 transmits the initial connection request message to Cloud Service Connector 138 to establish a connection (e.g. TCP connection) between the Source End Point Device 134 and the Cloud Service Connector 138.

Cloud Service Connector 138 receives the initial connection request message from Source End Point Device 134, and then completes the TCP protocol handshake with Source End Point Device 134 to establish a connection between Source End Point Device 134 and Cloud Service Connector 138.

In response to receipt of the initial connection request message from Source End Point Device 134, and in response to the destination port number contained in the initial connection request message, Cloud Service Connector 138 (e.g. Cloud Service Client 142) uses the port number contained in the initial connection request message to retrieve i) a customer name, and ii) an indication (e.g. name) of a requested service that correspond to the port number contained in the initial connection request. For example, Cloud Service Client 142 extracts the destination port number from the initial connection request message, and uses the destination port number extracted from the initial connection request message as an index into Customer and Service Lookup Table 144, which returns an entry containing the customer name and requested service name that correspond to that port number. In the example of FIG. 1, the customer name in the entry retrieved from Customer and Service Lookup Table 144 is the name of the medical imaging center that owns and operates Destination Communication Network 160, and the requested service name in the entry retrieved from Customer and Service Lookup Table 144 is the name of the service provided by Application Entity 178.

The Cloud Service Connector 138 (e.g. Cloud Service Client 142) creates a tunnel connection request message that contains the customer name and the indication of the requested service that were contained in the entry retrieved from the Customer and Service Lookup Table 144.

If necessary, as shown at 118 in FIG. 1, the Cloud Service Connector 138 (e.g. Cloud Service Client 142) establishes one or more connections (e.g. TCP connections) between Cloud Service Connector 138 and the Cloud Service 102.

Cloud Service Connector 138 (e.g. Cloud Service Client 142) also adds an entry to Routing Table 140 that maps the connection between Source End Point Device 134 and Cloud Service Connector 138 to the connection(s) between Cloud Service Connector 138 and Cloud Service 102.

As also shown at 118 in FIG. 1, the Cloud Service Connector 138 transmits the tunnel connection request message to Cloud Service 102.

Firewall 132 passes the tunnel connection request from Source Communication Network 130 to the Public Network 114, and Cloud Service 102 receives the tunnel connection request message. Cloud Service 702 then extracts the customer name and requested service name from the tunnel connection request message. Cloud Service 102 (e.g. Connection Routing Logic 106) uses the customer name and indication of the requested service extracted from the tunnel connection request message to index into Resource Location and Destination End Point Lookup Table 110. Resource Location and Destination End Point Lookup Table 110 returns an entry containing i) an identifier of a cloud service connector located in a destination communication network that is owned or under the control of the customer corresponding to the customer name in the index, and ii) an identifier of a destination end point device that is located in the destination communication network and that provides the requested service corresponding to the requested service name in the index. For example, in response to an index consisting of i) the customer name of the medical imaging center in which Destination Communication Network 160 is located, and that owns and operates Destination Communication Network 160, and ii) a requested service name that matches the service provided by Application Entity 178 in Destination End Point Device 164, Resource Location and Destination End Point Lookup Table 110 may return i) an identifier (e.g. IP address and/or port number) of Cloud Service Connector 168, and ii) an identifier (e.g. IP address and/or port number) of Destination End Point Device 164.

Further in response to receipt of the tunnel connection request message by the Cloud Service 102, and to the retrieved identifier of the Cloud Service Connector 168 and identifier of the Destination End Point Device 164, the Connection Routing Logic 106 begins conveying network traffic between the Source End Point Device 134 and the Destination End Point Device 164 through the Cloud Service 102 at least in part by tunneling TCP packets over one or more connections (e.g. TCP connections) i) between the Cloud Service Connector 138 located in the Source Communication Network 130 and the Cloud Service 102, and ii) between the Cloud Service 102 and the Cloud Service Connector 168 located in the Destination Communication Network 160.

Prior to conveying the network traffic between the Source End Point Device 134 and the Destination End Point Device 165, e.g. in response to receipt of the tunnel connection request message, Cloud Service 102 (e.g. Routing Control Logic 106) may check Connection Permissions Database 112 to determine whether Source End Point Device 134 is permitted to communicate with Destination End Point Device 165, and whether Destination End Point Device 165 is permitted to communicate with Source End Point Device 165. For example, Routing Control Logic 106 may check an access control list associated with Source End Point Device 134 to determine whether Source End Point Device 134 is permitted to communicate with Destination End Point Device 164, and an access control list associated with Destination End Point Device 164 to determine whether Destination End Point Device 164 is permitted to communicate with Source End Point Device 134. In response to determining that either i) Source End Point Device 134 is not permitted to communicate with Destination End Point Device 164, or ii) that Destination End Point Device 164 is not permitted to communicate with Source End Point Device 134, Cloud Service 102 may prevent any network traffic from being conveyed between Source End Point Device 134 and Destination End Point Device 164, and return an access denied message or the like to Cloud Service Client 142, for forwarding to the Source End Point Device 134 to inform Application Entity 148 that the attempt to access the service provided by Application Entity 178 failed.

As shown at reference number 120 in FIG. 1, conveying the network traffic between the Source End Point Device 134 and the Destination End Point Device 164 may include Cloud Service 102 establishing one or more connections (e.g. TCP connections) between the Cloud Service 102 and the Cloud Service Connector 168, if such connections have not previously been established. Cloud Service 102 (e.g. Connection Routing Logic 106) may also create an entry in the Connection Routing Table 108 that maps i) the connection(s) established between the Cloud Service Connector 138 and the Cloud Service 102 to ii) the connection(s) established between Cloud Service 102 and Cloud Service Connector 168. Such a mapping causes Connection Routing Logic 106 to tunnel TCP packets that are tunneled to Cloud Service 102 on the connection(s) established between Cloud Service Connector 138 and Cloud Service 102 onto the connection(s) established between Cloud Service 102 and Cloud Service Connector 168, and to tunnel TCP packets that are tunneled to Cloud Service 102 on the connections established between Cloud Service Connector 168 and Cloud Service 102 onto the connections established between Cloud Service 102 and Cloud Service Connector 138.

Cloud Service 102 may also create a destination configuration message that contains an IP address and a port number that are to be used by Cloud Service Connector 168 to establish a connection (e.g. a TCP connection) with Destination End Point Device 164. The IP address and port number contained in the destination configuration message are copies of the IP address and port number of Destination End Point Device 164 that were retrieved from Resource Location and Destination End Point Lookup Table 110 by Cloud Service 102 based on the customer name and requested service name extracted from the tunnel connection request message received from Cloud Service Connector 138. Cloud Service 102 may transmit the destination configuration message to Cloud Service Connector 168, as is also shown at reference number 120 in FIG. 1.

In response to receipt of the destination configuration message, Cloud Service Connector 168 (e.g. Cloud Service Proxy 176) extracts the IP address and port number of Destination End Point Device 164 from the destination configuration message, and establishes a connection (e.g. TCP connection) between Cloud Service Connector 168 and Destination End Point Device 164, e.g. by transmitting the Connection Request Message 182 (e.g. a SYN message) to Destination End Point Device 164. Upon receipt of Connection Request Message 182, Destination End Point Device 182 completes the TCP connection establishment handshake with Cloud Service Connector 182, resulting in a connection (e.g. TCP connection) being established between Destination End Point Device 164 and Cloud Service Connector 168.

Further in response to receipt of the destination configuration message, Cloud Service Connector 168 (e.g. Cloud Service Proxy 176) also adds an entry to Routing Table 170 that maps the connection between Cloud Service Connector 168 and Destination End Point Device 164 to the connection(s) between Cloud Service Connector 168 and Cloud Service 102.

For Cloud Service 102 to convey packets between Source End Point Device 134 and Destination End Point Device 164, TCP packets are received by Cloud Service Connector 138 that were transmitted to Cloud Service Connector 138 over the connection established between Source End Point Device 134 and Cloud Service Connector 138. In response to receipt of such packets, Cloud Service Connector 138 (e.g. Cloud Service Client 142) accesses Routing Table 140, and obtains the entry from Routing Table 140 that maps i) the connection between Source End Point Device 134 and Cloud Service Connector 138 and ii) the connection(s) between Cloud Service Connector 138 and Cloud Service 102. In response to this mapping, Cloud Service Connector 138 (e.g. Cloud Service Client 142) tunnels the packets received from Source End Point Device 134 onto the connection(s) between Cloud Service Connector 138 and Cloud Service 102, by encapsulating the packets received from Source End Point Device 134 into the data portions of packets (e.g. TCP packets) that are transmitted from Cloud Service Connector 138 to Cloud Service 102 on the connection(s) between Cloud Service Connector 138 and Cloud Service 102. In some embodiments, Cloud Service Connector 138 may operate to perform data compression, such as lossless data compression (e.g. LZ77, LZ78, or LZW lossless data compression), on the packets received from Source End Point Device 134 prior to encapsulating them into the data portions of the packets that are transmitted from Cloud Service Connector 138 to Cloud Service 102 on the connection(s) between Cloud Service Connector 138 and Cloud Service 102. In some embodiments, Cloud Service Connector 138 may further operate to perform data encryption, e.g. symmetric key encryption or asymmetric key encryption, on the compressed versions of the packets that were received from Source End Point Device 134, prior to encapsulating the resulting compressed and encrypted versions of the packets that were received from Source End Point Device 134, into the data portions of packets that are transmitted from Cloud Service Connector 138 to Cloud Service 102 on the connection(s) between Cloud Service Connector 138 and Cloud Service 102. In order to maintain data security, the decryption key needed to decrypt the encrypted packets is only shared with and/or stored on Cloud Service Connector 168 (e.g. in Cloud Service Proxy 176), thus preventing Cloud Service 102 from having access to the unencrypted version of the packets as they are conveyed from Source End Point Device 134 to Destination End Point Device 164 through Cloud Service 102.

Cloud Service 102 receives packets transmitted from Cloud Service Connector 138 on the connection(s) between the Cloud Service Connector 138 and Cloud Service 102. Cloud Service 102 (e.g. Connection Routing Logic 104) decapsulates the packets that are contained in the data portions of the packets that it receives from Cloud Service Connector 138. Cloud Service 102 (e.g. Connection Routing Logic 103) then determines the connection(s) onto which decapsulated packets received on connections between Cloud Service Connector 138 and Cloud Service 102 should be forwarded onto by retrieving an entry from the Connection Routing Table 108 that maps i) the connection(s) between the Cloud Service Connector 138 and the Cloud Service 102 to ii) the connection(s) between Cloud Service 102 and Cloud Service Connector 168. In response to the entry retrieved from the Connection Routing Table 108 that maps i) the connection(s) between the Cloud Service Connector 138 and the Cloud Service 102 to ii) the connection(s) between Cloud Service 102 and Cloud Service Connector 168, Cloud Service 102 (e.g. Connection Routing Logic 106) re-encapsulates the decapsulated packets into the data portions of packets that are transmitted from Cloud Service 102 on the connection(s) between Cloud Service 102 and Cloud Service Connector 168. Cloud Service 102 performs no decryption or decompression of the decapsulated packets.

Cloud Service Connector 168 receives the packets transmitted from Cloud Service 102 over the connection(s) between Cloud Service 102 and Cloud Service Connector 168. Cloud Service Connector 168 (e.g. Cloud Service Proxy 176) decapsulates the packets that are contained in the data portions of the packets that it receives from Cloud Service 102. If necessary, Cloud Service Connector 168 (e.g. Cloud Service Proxy 176) decrypts and decompresses the decapsulated packets. Cloud Service Connector 168 (e.g. Cloud Service Proxy 176) then determines the end point device in Destination Communication Network 160 to which the decrypted and decompressed decapsulated packets should be forwarded to by retrieving the entry from Routing Table 170 that maps the connection between Cloud Service Connector 168 and Destination End Point Device 164 to the connection(s) between Cloud Service 102 and Cloud Service Connector 168. In response to the entry retrieved from the Routing Table 170 that maps the connection between Cloud Service Connector 168 and Destination End Point Device 164 to the connection(s) between Cloud Service Connector 168 and Cloud Service 102, Cloud Service Connector 168 (e.g. Cloud Service Proxy 176) transmits the decrypted and decompressed decapsulated packets into the connection between Cloud Service Connector 168 and Destination End Point Device 164, for receipt by Destination End Point Device 164.

In order for the Cloud Service 102 to convey packets between Source End Point Device 134 and Destination End Point Device 164, TCP packets are also received by Cloud Service Connector 168 that were transmitted to Cloud Service Connector 168 over the connection established between Destination End Point Device 164 and Cloud Service Connector 168. Cloud Service Connector 168 (e.g. Cloud Service Proxy 176) accesses Routing Table 170, and obtains the entry from Routing Table 170 indicating that there is a mapping between i) the connection between Destination End Point Device 164 and Cloud Service Connector 168 and ii) the connection(s) between Cloud Service Connector 168 and Cloud Service 102. In response to this mapping, Cloud Service Connector 168 (e.g. Cloud Service Proxy 176) tunnels the packets received from Destination End Point Device 164 onto the connection(s) between Cloud Service Connector 168 and Cloud Service 102, by encapsulating the packets received from Destination End Point Device 164 into the data portions of packets (e.g. TCP packets) that are transmitted from Cloud Service Connector 168 to Cloud Service 102 on the connection(s) between Cloud Service Connector 168 and Cloud Service 102. Similarly as described above with regard to Cloud Service Connector 138, in some embodiments, Cloud Service Connector 168 (e.g. Cloud Service Proxy 176) may operate to perform data compression, such as lossless data compression (e.g. LZ77, LZ78 or LZW lossless data compression), on the packets received from Destination End Point Device 164 prior to encapsulating them into the data portion of packets that are transmitted from Cloud Service Connector 168 to Cloud Service 102 on the connection(s) between Cloud Service Connector 168 and Cloud Service 102. In some embodiments, Cloud Service Connector 168 may further operate to perform data encryption, e.g. symmetric key encryption or asymmetric key encryption, on the compressed versions of the packets that were received from Destination End Point Device 164, prior to encapsulating them into the data portion of packets that are transmitted from Cloud Service Connector 168 to Cloud Service 102 on the connection(s) between Cloud Service Connector 168 and Cloud Service 102. Again, in order to maintain data security, the decryption key needed to decrypt the encrypted packets is only shared with and/or stored on Cloud Service Connector 138 (e.g. in Cloud Service Client 142), thus preventing Cloud Service 102 from having access to the unencrypted version of the packets being conveyed from Destination End Point Device 164 to Source End Point Device 134 through Cloud Service 102.

Cloud Service 102 receives packets transmitted from Cloud Service Connector 168 on the connection(s) between the Cloud Service Connector 168 and Cloud Service 102. Cloud Service 102 (e.g. Connection Routing Logic 104) decapsulates the packets that are contained in the data portions of the packets that it receives from Cloud Service Connector 138. Cloud Service 102 (e.g. Connection Routing Logic 103) then determines the connection(s) onto which the decapsulated packets should be forwarded onto by retrieving the entry from the Connection Routing Table 108 that maps i) the connection(s) between the Cloud Service Connector 138 and the Cloud Service 102 to ii) the connection(s) between Cloud Service 102 and Cloud Service Connector 168. In response to the entry retrieved from the Connection Routing Table 108 that maps i) the connection(s) between the Cloud Service Connector 138 and the Cloud Service 102 to ii) the connection(s) between Cloud Service 102 and Cloud Service Connector 168, Cloud Service 102 (e.g. Connection Routing Logic 106) re-encapsulates the decapsulated packets into the data portions of packets that are transmitted from Cloud Service 102 on the connection(s) between Cloud Service 102 and Cloud Service Connector 138. Again, Cloud Service 102 performs no decryption or decompression of the decapsulated packets.

Cloud Service Connector 138 receives the packets transmitted from Cloud Service 102 over the connection(s) between Cloud Service 102 and Cloud Service Connector 138. Cloud Service Connector 138 (e.g. Cloud Service Client 142) decapsulates the packets that are contained in the data portions of the packets that it receives from Cloud Service 102. If necessary, Cloud Service Connector 138 (e.g. Cloud Service Client 142) decrypts and decompresses the decapsulated packets. Cloud Service Connector 138 (e.g. Cloud Service Client 142) then determines the end point device in Source Communication Network 130 to which the decrypted and decompressed decapsulated packets should be forwarded to by retrieving the entry from Routing Table 140 that maps the connection between Cloud Service Connector 138 and Source End Point Device 134 to the connection(s) between Cloud Service Connector 138 and Cloud Service 102. In response to the entry retrieved from the Routing Table 140 that maps the connection between Cloud Service Connector 138 and Source End Point Device 134 to the connection(s) between Cloud Service Connector 138 and Cloud Service 102, Cloud Service Connector 138 (e.g. Cloud Service Client 142) transmits the decrypted and decompressed decapsulated packets on the TCP connection between Cloud Service Connector 138 and Source End Point Device 134, for receipt by Source End Point Device 134.

In this way, by conveying packets between Source End Point Device 134 and Destination End Point Device 164, Cloud Service 102 may enables Application Entity 148 to access one or more medical images (e.g. computed tomography ("CT") scans) through the Application Entity 178, in the case where Application Entity 178 provides a medical image retrieval service that enables Application Entities in Source Communication Network 130, such as Application Entity 148, to retrieve copies of one or more medical images from an Image Archive 179 contained within Destination End Point Device 164 (e.g. a medical image retrieval service).

Figure 2:
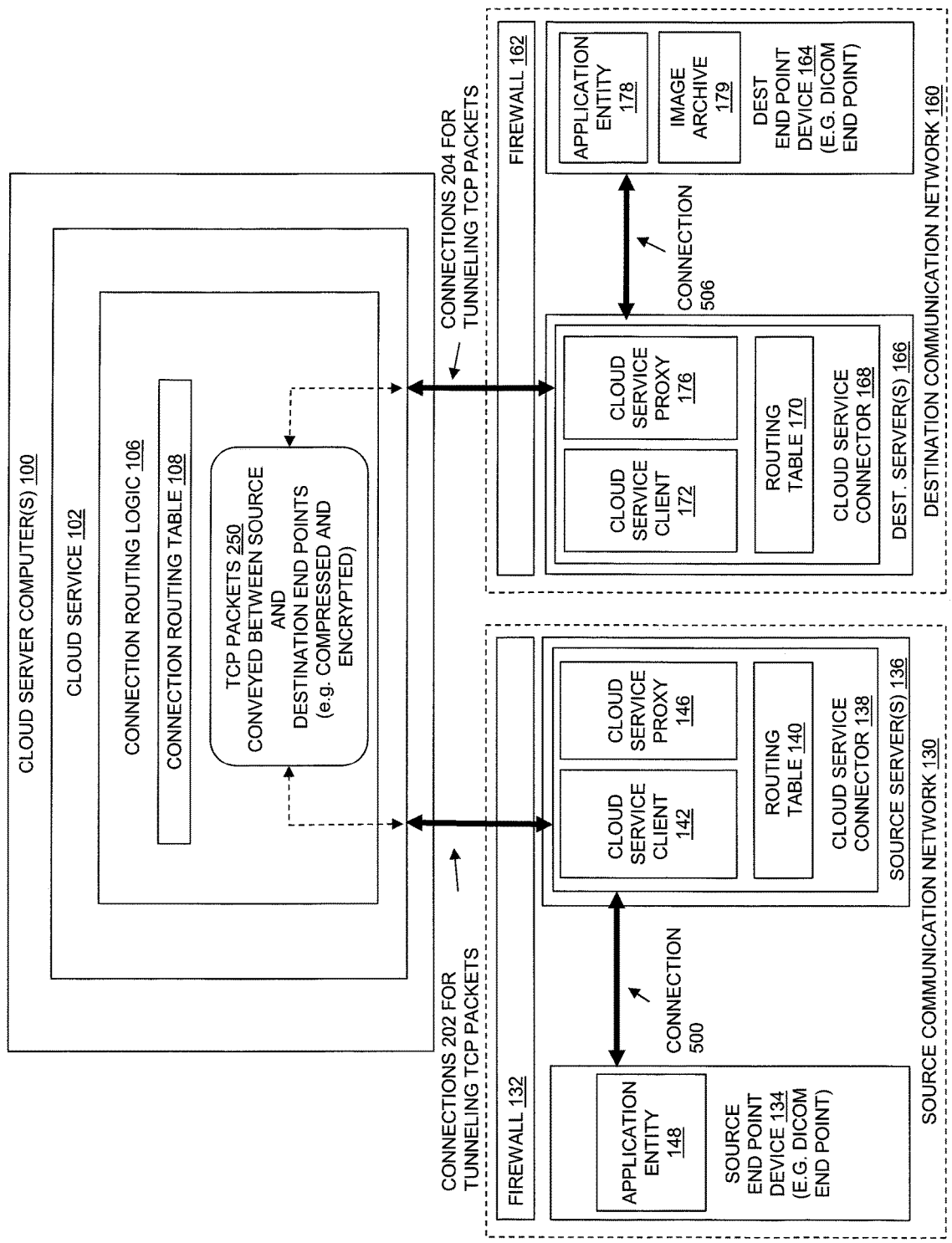
FIG. 2 is a block diagram showing an example of components in some embodiments tunneling packets over connections i) between a cloud service connector in the source communication network and the cloud service, and ii) between a cloud service connector in the destination communication network and the cloud service.

FIG. 2 is a block diagram showing an example of components in some embodiments for tunneling packets over i) one or more connections between Cloud Service Connector 138 and the Cloud Service 102, and ii) one or more connections between a Cloud Service Connector 168 and the Cloud Service 102. As shown in FIG. 2, some number of Connections 202 (e.g. TCP connections) may be established between Cloud Service Connector 138 and Cloud Service 102. As also shown in FIG. 2, some number of Connections 204 (e.g. TCP connections) may be established between Cloud Service Connector 168 and Cloud Service 102. TCP Packets 250 conveyed between Source End Point Device 134 and Destination End Point Device 164 may include TCP packets that are transmitted from Source End Point Device 134 over Connection 500 to Cloud Service Connector 138, then compressed and encrypted by Cloud Service Connector 138, then tunneled through Connections 202, then tunneled through Connections 204, then decrypted and decompressed by Cloud Service Connector 168, then transmitted from Cloud Service Connector 168 over Connection 506 to Destination End Point 164.

TCP Packets 250 conveyed between Source End Point Device 134 and Destination End Point Device 164 may also include TCP packets that are transmitted from Destination End Point Device 164 over Connection 506 to Cloud Service Connector 168, then compressed and encrypted by Cloud Service Connector 168, then tunneled through Connections 204, then tunneled through Connections 202, then decrypted and decompressed by Cloud Service Connector 138, then transmitted from Cloud Service Connector 138 over Connection 500 to Destination End Point 164.

In some embodiments, Connections 202 may be made up of multiple individual connections (e.g. multiple TCP connections) in order to provide fault tolerance between Cloud Service Connector 138 and Cloud Service 102 with regard to individual connection failures. In embodiments in which multiple individual connections are established between Cloud Service Connector 138 and Cloud Service 102, the failure of a single one of the multiple connections will not interrupt or delay the flow of packets between Cloud Service Connector 138 and Cloud Service 102 over Connections 202, since the other connection or connections in Connections 202 continue to be used to carry packets while the failed connection is being re-established. Also in embodiments in which multiple individual connections are established between Cloud Service Connector 138 and Cloud Service 102, load balancing may be performed across the multiple connections, such that the packets passed between Cloud Service Connector 138 and Cloud Service 102 are spread across the multiple connections in order to provide a high level of overall throughput performance.

Connections 204 may also be made up of multiple individual connections (e.g. multiple TCP connections) in order to provide fault tolerance between Cloud Service 102 and Cloud Service Connector 168 with regard to individual connection failures. In embodiments in which multiple individual connections are established between Cloud Service 102 and Cloud Service Connector 168, the failure of a single one of the multiple connections will not interrupt the flow of packets between Cloud Service 102 and Cloud Service Connector 168 over Connections 204, since the other connection or connections in Connections 204 continue to be used to carry packets while the failed connection is being re-established. Also in embodiments in which multiple individual connections are established between Cloud Service 102 and Cloud Service Connector 168, load balancing may be performed across the multiple connections, such that the packets passed between the Cloud Service 102 and Cloud Service Connector 168 are spread across the multiple connections in order to provide a high level of overall throughput performance.

While for purposes of concise illustration FIGS. 1-2 show a single end point device contained in Source Communication Network 130, Source Communication Network 130 may include multiple end point devices, each of which can use Cloud Service Connector 138 to establish communications with end point devices located in Destination Communication Network 160. Similarly, while FIGS. 1-2 show a single end point device contained in Destination Communication Network 160, Destination Communication Network 160 may contain multiple end point devices, each of which may operate to provide a service from Destination Communication Network 160 to one or more end point devices located in Source Communication Network 130. In addition, while only a single cloud connector virtual machine is shown in Source Communication Network 130 and in Destination Communication Network 160, each one of Source Communication Network 130 and/or Destination Communication Network 160 may be provided with multiple cloud connector virtual machines.

Figure 3:
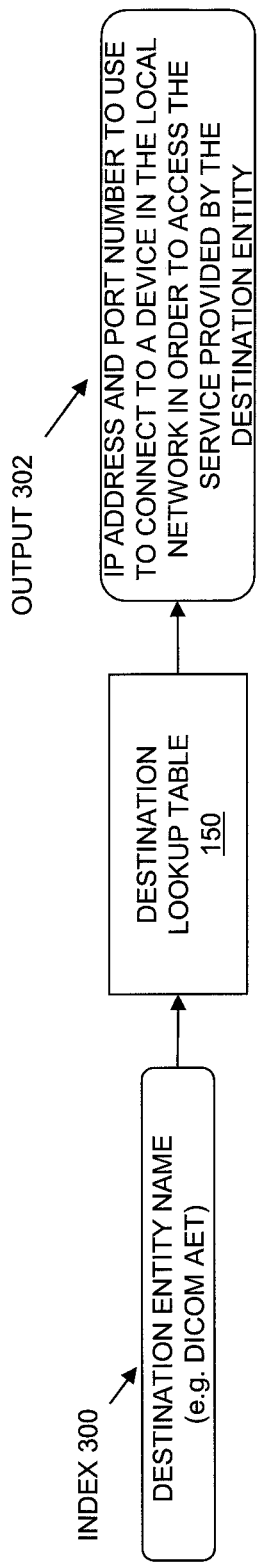
FIG. 3 is a block diagram showing an example of the operation of a destination lookup table in some embodiments.

FIG. 3 is a block diagram showing an example of the operation of a destination lookup table in some embodiments, including some embodiments of the Destination Lookup Table 150 contained in the Source End Point Device 134 shown in FIG. 1. As shown in FIG. 3, in response to an Index 300 that is made up of a destination entity name, such as a DICOM Application Entity Title corresponding to an Application Entity that provides a desired service, Destination Lookup Table 150 returns an Output 302 that consists of or includes an IP address and port number to be used to establish a connection with another device in the local network, in order to access the desired service. In the case where the Application Entity that provides the desired service executes on a device located within the local network, e.g. on another end point device located within Source Communication Network 130, the IF address in Output 302 is the IP address of the end point device in the local network on which the Application Entity that provides the desired service executes. Alternatively, in the case where the Application Entity that provides the desired service executes on a device that is located outside the local network, e.g. on an endpoint device that is located within Destination Communication Network 130, the IP address in Output 302 is the IP address of Cloud Service Connector 136, and the port number in Output 302 is a port number corresponding to the end point device that is located outside of the local network on which the Application Entity that provides the desired service executes.

Figure 4:
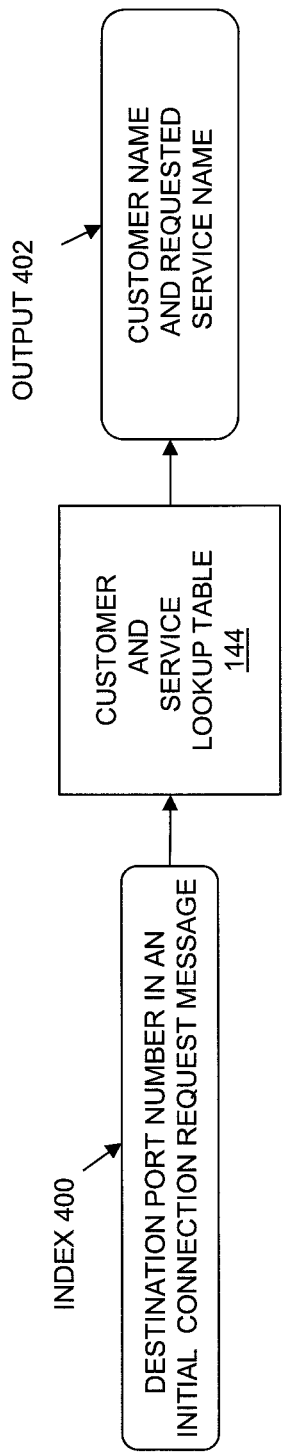
FIG. 4 is a block diagram showing an example of the operation of a customer and requested service lookup table in some embodiments.

FIG. 4 is a block diagram showing an example of the operation of a customer and service lookup table in some embodiments, including some embodiments of the Customer and Service Lookup Table 144 contained in the Cloud Service Connector 138 shown in FIG. 1. As shown in FIG. 4, in response to an Index 400 that is made up of a destination port number extracted from an initial connection request message received by Cloud Service Connector 138, such as a TCP connection request message (e.g. a TCP "SYN" message), Customer and Service Lookup Table 144 returns an Output 402 that consists of or includes a customer name and an indication of a requested service (e.g. a name of a requested service) that correspond to the extracted destination port number. The customer name and indication of the requested service are then included in a tunnel connection request message created by Cloud Service Connector 138 and transmitted from Cloud Service Connector 138 to Cloud Service 102.

Figure 5:
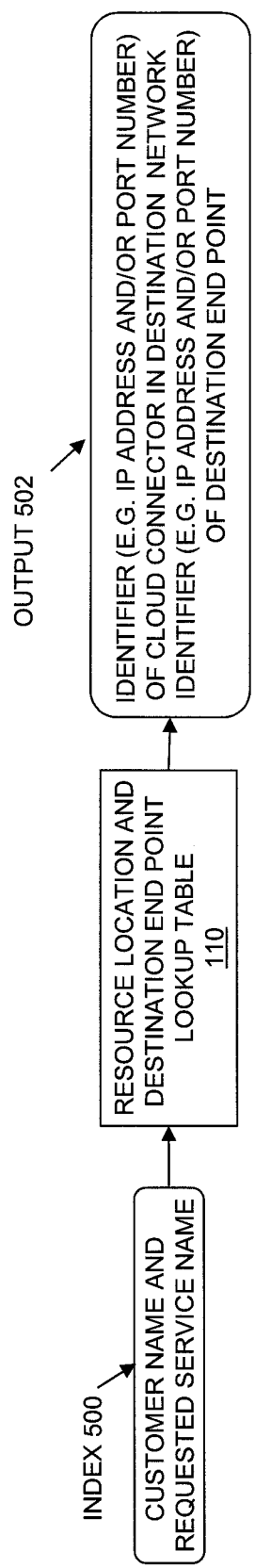
FIG. 5 is a block diagram showing an example of a resource location and destination end point lookup table in some embodiments.

FIG. 5 is a block diagram showing an example of the operation of a resource location and destination end point lookup table in some embodiments, including some embodiments of the Resource Location and Destination End Point Lookup Table 110 contained in the Cloud Service 102 shown in FIG. 1. As shown in FIG. 5, in response to an Index 500 that is made up of a customer name and request service name extracted from a tunnel connection request message received by Cloud Service 102, Resource Location and Destination End Point Lookup Table 110 returns an Output 502 that consists of or includes an identifier (e.g. IP address and/or port number) of a cloud service connector located in the communication network that belongs to the customer of the cloud service provider corresponding to the customer name, and an identifier (e.g. IP address and/or port number) of an end point device that provides the requested service within that communication network. The Cloud Service 102 then uses the identifier of the cloud service connector in the Output 502 to establish one or more connections (e.g. TCP connections) with the cloud service connector within the communication network of the customer, and sends the identifier of the destination end point device in the Output 502 to the cloud service connector within the communication network of the customer.

Figure 6:
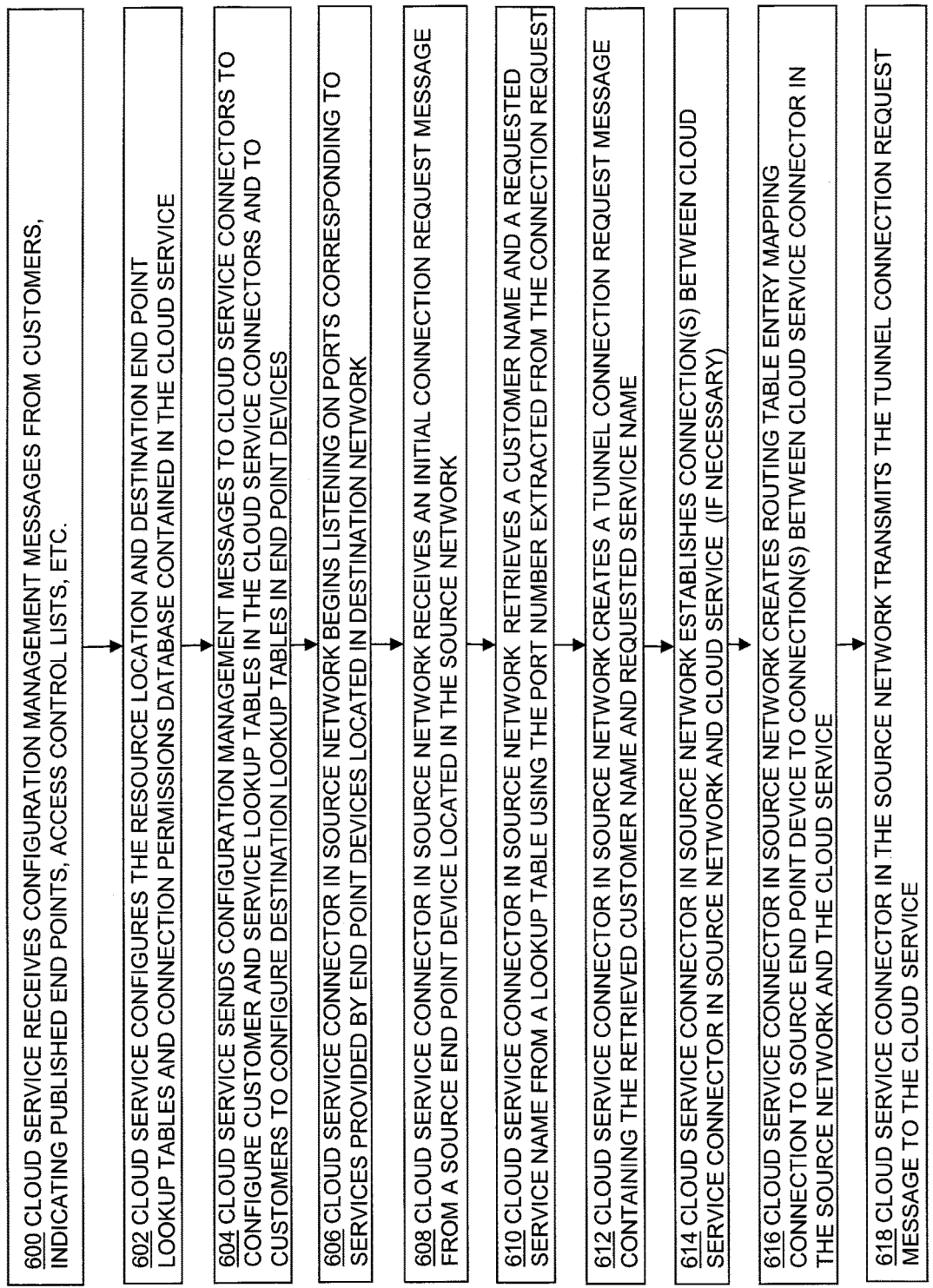
FIG. 6 is a flow chart showing an example of steps performed during operation of some embodiments.

FIG. 6 is a flow chart showing an example of steps performed during operation of some embodiments. At step 600, the cloud service receives configuration management Messages from customers of the cloud services provider that owns and/or manages the cloud service. For each customer, the configuration management messages may indicate one or more devices located within that customer's communication network that are to be published through the cloud service to one or more other customers that are also indicated in the configuration management messages, in order to cause the cloud service to make the indicated devices available for access by the end point devices located in the communication networks of those other customers. The configuration management messages may include access control lists for each device, containing names of customers whose devices are to be permitted to access a given device, and/or identifiers of individual devices that are to be allowed to access the device. At step 602 the cloud service configures the resource location and destination end point lookup tables and connection permissions database contained in the cloud service based on the contents of the configuration management messages received at step 600. At step 604 the cloud service sends configuration management messages to cloud service connectors to configure the customer and service lookup tables contained in the cloud service connectors. Further at step 604 the cloud service may send transmit one or more configuration management messages to a system administrator or the like for a customer that owns or otherwise controls a source communication network, for the system administrator to use to configure destination lookup tables contained in the end point devices located within the source communication network.

At step 606, a cloud service connector executing in the source communication network begins listening for connection requests that may be received from any device located in the source communication network, on each one of multiple port numbers, where each one of the multiple port numbers corresponds to a different one of multiple services provided by application entities executing in destination end point devices that are located in a destination communication network that is isolated from the source communication network.

At step 608, the cloud service connector in the source communication network receives an initial connection request message from a source end point device located within the source communication network. At step 610, the cloud service connector located in the source communication network retrieves a customer name and a requested service name from a customer and service lookup table, using the destination port number extracted from the connection request as an index. At step 612, the cloud service connector in the source communication network creates a tunnel connection request message containing the retrieved customer name and requested service name, and at step 614 the cloud service connector in the source communication network establishes one or more connections (e.g. TCP connections) between the cloud service connector in the source communication network and the cloud service, in response to determining that such connections have not previously been established. At step 616 the cloud service connector in the source communication network creates a routing table entry mapping i) the connection established between the cloud service connector in the source communication network and the source end point device to ii) the connection(s) established between the cloud service connector in the source communication network and the cloud service. At step 618 the cloud service connector in the source communication network transmits the connection request message to the cloud service.

Figure 7:
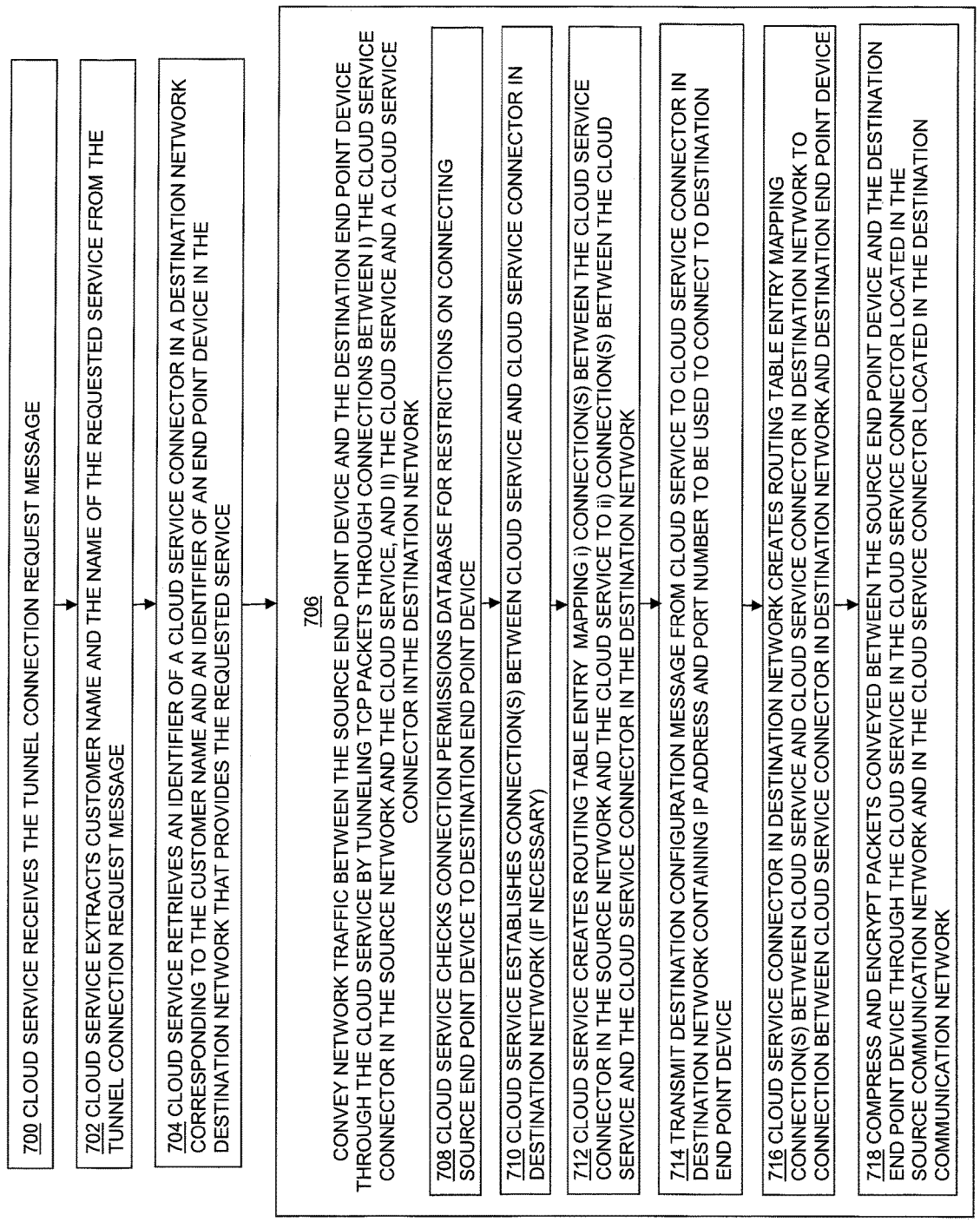
FIG. 7 is a flow chart showing an example of further steps that may be performed after the steps of FIG. 6 during operation of some embodiments.

FIG. 7 is a flow chart showing an example of further steps that may be performed subsequent to the steps of FIG. 6 during operation of some embodiments. At step 700, the cloud service receives the tunnel connection request message from the cloud service connector located in the source communication network. At step 702, the cloud service extracts the customer name and the name of the requested service from the tunnel connection request message. At step 704, the cloud service uses the customer name extracted from the tunnel connection request message (and/or the name of the requested service extracted from the tunnel connection request message) to retrieve an identifier (e.g. IP address and/or port number) of a cloud service connector that is located in a destination communication network that corresponds to the customer name, i.e. an identifier of a cloud service connector that executes on one or more server computers located in destination communication network that is a private communication network owned by or under the control of a customer of the cloud service (e.g. a business entity or organization) that is identified by the customer name. Further at step 704, the cloud service uses the name of the requested service extracted from the tunnel connection request message (and/or the customer name extracted from the tunnel connection request message) to retrieve an identifier (e.g. IP address and/or port number) of an end point device that provides the requested service, and that is located in the destination communication network.

At step 706, network traffic (e.g. network traffic made up of TCP packets) is conveyed between the source end point device and the destination end point device through the cloud service by tunneling TCP packets through i) one or more TCP connections between the cloud service connector located in the source communication network and the cloud service, and ii) one or more TCP connections between the cloud service and a cloud service connector located in the destination communication network.

Conveying the network traffic between the source end point device and the destination end point device at step 706 may include one or more of the steps 708, 710, 712, 714, 716, and/or 718. For example, at step 708 the cloud service may check the connection permissions database in the cloud service prior to conveying any network traffic between the source end point device and the destination end point device. The cloud service may convey network traffic between the source end point device and the destination end point device only in response to determining from the contents of the connections permission database that both i) an access control list for the source end point device contains an identifier of the destination end point device, and ii) an access control list for the destination end point device contains an identifier of the source end point device. The cloud service may further prevent any network traffic from being conveyed between the source end point device and the destination end point device in response to determining from the contents of the connections permission database that either i) the access control list for the source end point device does not include an identifier of the destination end point device, or ii) the access control list for the destination end point device does not include an identifier of the source end point device.

In another example, at step 710 the cloud service may, in response to a determination that no connection has previously been established between the cloud service and the cloud service connector located in the destination communication network, establish one or more connections (e.g. TCP connections) between the cloud service and the cloud service connector located in the destination communication network, e.g. using the identifier of the cloud service connector located in the destination communication network retrieved at step 704.

In another example, at step 712, the cloud service may create an entry in a connection routing table contained in the cloud service that maps i) the one or more connections established between the cloud service connector located in the source communication network and the cloud service, to ii) the one or more connection(s) established between the cloud service and the cloud service connector located in the destination communication network.

In another example, at step 714, the cloud service may transmit a destination configuration message from to the cloud service connector located in the destination communication network. The destination configuration message transmitted at step 714 may contain the identifier (e.g. IP address and/or port number) of the destination end point device, and that are to be used by the cloud service connector located in the destination communication network to establish a connection (e.g. a TCP connection) with the destination end point device. In response to receipt of the destination configuration message, the cloud service connector located in the destination communication network may establish a connection with the destination end point device using the identifier of the destination end point device contained in the destination configuration message.

In another example, at step 716, the cloud service connector located in the destination communication network may create a routing table entry in a routing table contained in the cloud service connector located in the destination communication network. The routing table entry created at step 716 maps the i) connection(s) established between the cloud service and the cloud service connector located in the destination communication network to ii) the connection established between the cloud service connector located in the destination communication network and the destination end point device.

In another example, at step 718, packets conveyed between the source end point device and the destination end point device are compressed and/or encrypted by the cloud service connector located in the source communication network and in the cloud service connector located in the destination communication network. For example, the cloud service connector located in the source communication network may perform data compression on the packets it receives from the source end point device, to create compressed versions of the packets received from the source end point device, prior to tunneling the compressed versions of the received packets through the connection(s) between the cloud service connector located in the source communication network and the cloud service. The cloud service connector located in the source communication network may perform data encryption on the compressed or uncompressed versions of the packets it receives from the source end point device, to create encrypted or encrypted and compressed versions of the packets received from the source end point device, prior to tunneling the encrypted or encrypted and compressed versions of the received packets through the connection(s) between the cloud service connector located in the source communication network and the cloud service.

The cloud service connector located in the destination communication network may perform decryption and/or decompression on the packets tunneled to the cloud service connector located in the destination communication network through the connection(s) between the cloud service and the cloud service connector located in the destination communication network.

Similarly, the cloud service connector located in the destination communication network may perform data compression on the packets it receives from the destination end point device, to create compressed versions of the packets received from the destination end point device, prior to tunneling the compressed versions of the received packets through the connection(s) between the cloud service connector located in the destination communication network and the cloud service. The cloud service connector located in the destination communication network may perform data encryption on the compressed or uncompressed versions of the packets it receives from the destination end point device, to create encrypted or encrypted and compressed versions of the packets received from the destination end point device, prior to tunneling the encrypted or encrypted and compressed versions of the received packets through the connection(s) between the cloud service connector located in the destination communication network and the cloud service.

The cloud service connector located in the source communication network may perform decryption and/or decompression on the packets tunneled to the cloud service connector located in the source communication network through the connection(s) between the cloud service and the cloud service connector located in the source communication network.

Figure 8:
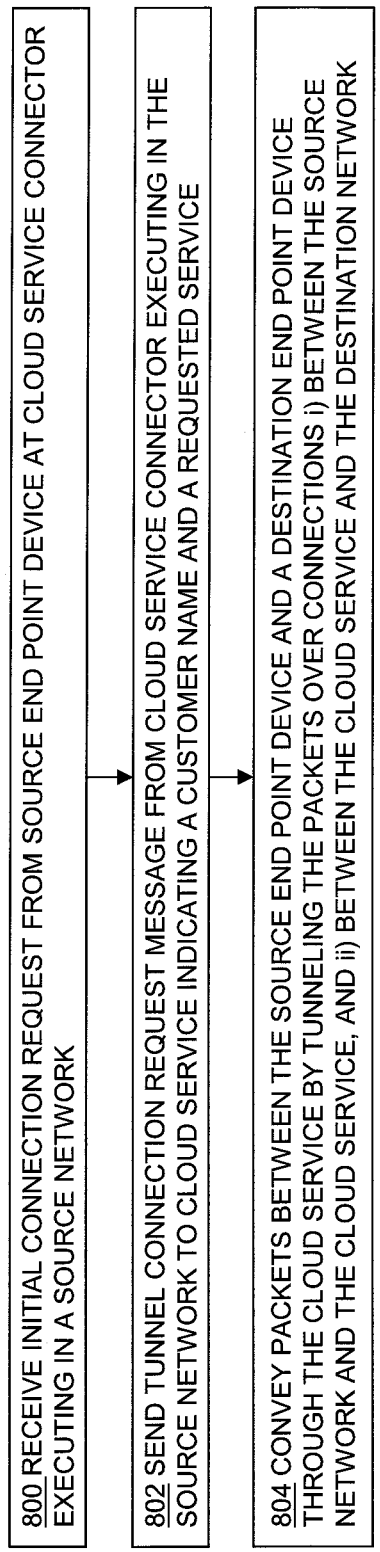
FIG. 8 is a flow chart showing another example of steps that may be performed during operation of some embodiments.

FIG. 8 is flow chart showing another example of steps that may be performed during operation of some embodiments. At step 800, a cloud service connector located within a source communication network receives an initial connection request message from a source end point device also located within the source communication network. The cloud service connector in the source communication network determines i) a name of a customer of a cloud service provider that owns and operates a cloud service that is located in a public network, and ii) a name of a requested service, based on the contents of the initial connection request message, e.g. by indexing into a customer and requested service lookup table using a value extracted from a destination port field within the initial connection request message. At step 802, the cloud service connector located within the source communication network creates a tunnel connection request message that contains the name of the customer, and the name of the requested service, and transmits the tunnel connection request message to the cloud service. At step 804, packets (e.g. TCP packets) are conveyed between the source end point device and a destination end point device that i) is located in a destination network that is isolated from the source communication network and owned or controlled by the customer, and ii) provides the requested service. The packets are conveyed between the source end point device and the destination end point device through the cloud service by tunneling the packets over connections i) between the cloud service connector located in the source communication network and the cloud service, and ii) between the cloud service and a cloud service connector located in the destination network.

While some of the above examples refer to end point devices that communicate through the cloud service using cloud service connectors located in their respective isolated networks as DICOM end point devices, the technology described herein is not limited to embodiments that provide communication between DICOM end point devices. Alternatively, or in addition, the technology described herein may be embodied such that the cloud service provides communication between Internet of Things (IoT) devices that are located in different isolated networks, such as IoT devices that communicate with each other using the Message Queuing Telemetry Transport (MQTT) protocol, and/or IoT devices that communicate with each other using the Constrained Application Protocol (CoAP). With reference to FIGS. 1-2, the technology described herein may be embodied to provide communication between IoT end point devices located in Source Communication Network 130 and Destination Communication Network 160 through Cloud Service 102. For example, a cloud service connector may execute on servers contained in an isolated source communication network that contains multiple IoT end point devices. The cloud service connector in the source communication network may enable IoT devices located in the isolated source communication network to communicate through the cloud service with one or more IoT end point devices that are located in an isolated destination network of IoT devices, in which another cloud service connector executes. Accordingly, the technology described herein may provide communications between IoT end point devices as described above with reference to the Source End Point Device 134 and Destination End Point Device 164, the Cloud Service Connector 138, the Cloud Service Connector 168, and the Cloud Service 102 shown in FIGS. 1-2.

In another example, the technology described herein may be embodied such that the cloud service provides, either alternatively or in addition, communication between a print server device located in one isolated communication network and a printer device located in another isolated communication network. The technology described herein may be embodied to provide communication between a print server in one isolated communication network and a printer in another isolated communication network that communicate using printing protocols such as the Internet Printing Protocol or the Line Printer Daemon protocol. With reference to FIGS. 1-2, the technology described herein may be embodied to provide communication between a source end point device that is a print server located in Source Communication Network 130 and destination end point device that is a printer located in Destination Communication Network 160. For example, a cloud service connector may execute on servers located in an isolated source communication network that contains a print server, and enable the print server to communicate through the cloud service with one or more printer devices that are located in an isolated destination communication network, and in which another cloud service connector executes. Accordingly, the technology described herein may be embodied to provide communications between a print server and one or more printers located in different isolated communication networks, as described above with reference to the Source End Point Device 134 and Destination End Point Device 164, the Cloud Service Connector 138, the Cloud Service Connector 168, and the Cloud Service 102 shown in FIGS. 1-2.

In another example, the technology described herein may be embodied such that the cloud service provides, either alternatively or in addition, HyperText Transfer Protocol (HTTP) communication between an end point device that contains a Web server and that is located in one isolated communication network, and an end point device that is located in another isolated communication network, and that implements a Representational State Transfer (REST) Application Programming Interface (API), such as a client device that executes a Web Browser program or the like. For example, the technology described herein may be embodied to provide communication between a source end point device that contains a Web browser and that is located in Source Communication Network 130, and a destination end point device that contains a Web server and is located in Destination Communication Network 160, as shown in FIGS. 1-2, and described above with reference to the Source End Point Device 134 and Destination End Point Device 164, the Cloud Connector 138, the Cloud Connector 168, and the Cloud Service 102.

In another example, the technology described herein may be embodied such that the cloud service provides, either alternatively or in addition, Structured Query Language (SQL) communication between a source end point device that contains a database client operable to transmit SQL commands, and that is located in an isolated source communication network on which a cloud service connector executes, and a destination end point device that contains a database server operable to receive and process SQL commands, and that is located in an isolated destination communication network on which another cloud service connector executes. For example, the technology described herein may be embodied to provide communication between a source end point device that contains a database client located in Source Communication Network 130 and a destination end point device that contains a database server and that is located in Destination Communication Network 160, as shown in FIGS. 1-2. Communications between the source end point device containing the database client device and the destination end point device containing the database server may be provided as described above with reference to the Source End Point Device 134 and Destination End Point Device 164, the Cloud Connector 138, the Cloud Connector 168, and the Cloud Service 102 of FIG. 1.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, aspects of the embodiments illustrated herein may take the form of a computer program product embodied at least in part in one or more non-transitory computer readable storage medium(s) having computer readable program code stored thereon for causing one or more processors and/or a computer system to carry out those aspects.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

It will be understood by those of ordinary skill in the art that modification to and variation of the illustrated embodiments may be made without departing from the inventive concepts described herein.

What is claimed is:

1. A method of providing communication connectivity between network devices that are located in isolated communication networks through a centralized cloud service, comprising:
   receiving, from a source end point device located in a source communication network, by a cloud service connector located in the source communication network, an initial connection request message, wherein the initial connection request message requests a connection on a port number that is contained in the initial connection request, and wherein the cloud service connector is separate and independent from the source end point device;
   retrieving, by the cloud service connector located in the source communication network, in response to receipt of the initial connection request message and based on the port number contained in the initial connection request message, both i) a customer name that corresponds to a destination communication network, and ii) an indication of a requested service, at least in part by using the port number contained in the initial connection request message as an index into a lookup table contained in the cloud service connector to cause the lookup table to return an entry in the lookup table corresponding to the port number and containing the customer name and the indication of the requested service, wherein the retrieved customer name and indication of the requested service name each correspond to the port number contained in the initial connection request;
   creating, by the cloud service connector located in the source communication network using the customer name and the indication of the requested service, a tunnel connection request message, wherein the tunnel connection request message contains the customer name and the indication of the requested service;
   transmitting the tunnel connection request message, by the cloud service connector located in the source communication network, to a cloud service located in a public communication network that is communicably connected to the source communication network;
   receiving the tunnel connection request message by the cloud service;
   extracting, by the cloud service in response to receipt of the tunnel connection request message, the customer name and the indication of the requested service from the tunnel connection request message;
   retrieving, by the cloud service further in response to receipt of the tunnel connection request message, and in response to the customer name and the indication of the requested service extracted from the tunnel connection request message, i) an identifier of a cloud service connector located in the destination communication network that corresponds to the customer name extracted from the tunnel connection request, and ii) an identifier of a destination end point device located in the destination communication network that provides the requested service, wherein the destination communication network is also communicably connected to the public communication network, and wherein network traffic on the destination communication network is isolated from network traffic on the source communication network; and
   conveying network traffic between the source end point device and the destination end point device through the cloud service by tunneling packets over connections i) between the cloud service connector located in the source communication network and the cloud service and ii) between the cloud service and the cloud service connector located in the destination communication network.

2. The method of claim 1, further comprising:
   receiving, by the cloud service, one or more configuration management messages, wherein the configuration management messages include an access control list for the source end point device and an access control list for the destination end point device;
   storing the access control list for the source end point device and the access control list for the destination end point device into a connection permissions database in the cloud service; and
   wherein conveying the network traffic between the source end point device and the destination end point device through the cloud service includes:
   i) determining, by the cloud service from the connection permissions database, whether the access control list for the source end point device contains an identifier of the destination end point device,
   ii) determining, by the cloud service from the connection permissions database, whether the access control list for the destination end point device contains an identifier of the source end point device, and
   iii) conveying the network traffic between the source end point device and the destination end point device in response to determining that the access control list for the source end point device contains an identifier of the destination end point device and that the access control list for the destination end point device contains an identifier of the source end point device.

3. The method of claim 1, further comprising:
establishing multiple connections between the cloud service connector located in the source communication network and the cloud service to provide fault tolerance and load balancing between the cloud service connector located in the source communication network and the cloud service; and
establishing multiple connections between the cloud service and the cloud service connector located in the destination communication network to provide fault tolerance and load balancing between the cloud service and the cloud service connector located in the destination communication network.

4. The method of claim 3, further comprising:
creating, by the cloud service, an entry in a connection routing table contained in the cloud service, wherein the entry created in the connection routing table maps i) the connections established between the cloud service connector located in the source communication network and the cloud service, to ii) the connections established between the cloud service and the cloud service connector located in the destination communication network; and
wherein the cloud service, responsive to the entry created in the connection routing table that maps i) the connections established between the cloud service connector located in the source communication network and the cloud service, to ii) the connections established between the cloud service and the cloud service connector located in the destination communication network, processes packets tunneled to the cloud service by:
tunneling packets that are tunneled to the cloud service on the connections established between the cloud service connector located in the source communication network and the cloud service onto the connections established between the cloud service and the cloud service connector located in the destination communication network, and
tunneling packets that are tunneled to the cloud service on the connections established between the cloud service and the cloud service connector located in the destination communication network onto the connections established between the cloud service connector located in the source communication network and the cloud service.

5. The method of claim 4, further comprising:
performing data compression, by the cloud service connector located in the source communication network on packets received by the cloud service connector located in the source communication network from the source end point device, to generate compressed versions of the packets received by the cloud service connector located in the source communication network from the source end point device;
tunneling the compressed versions of the packets received by the cloud service connector located in the source communication network to the cloud service through the connections established between the cloud service connector located in the source communication network and the cloud service;

decompressing, by the cloud service connector located in the destination communication network, packets tunneled to the cloud service connector located in the destination communication network from the cloud service;
performing data compression, by the cloud service connector located in the destination communication network on packets received by the cloud service connector located in the destination communication network from the destination end point device, to generate compressed versions of the packets received by the cloud service connector located in the destination communication network from the destination end point device;
tunneling the compressed versions of the packets received by the cloud service connector located in the destination communication network to the cloud service through the connections established between the cloud service connector located in the destination communication network and the cloud service; and
decompressing, by the cloud service connector located in the source communication network, packets tunneled to the cloud service connector located in the source communication network from the cloud service.

6. The method of claim 4, further comprising:
performing data encryption, by the cloud service connector located in the source communication network on packets received by the cloud service connector located in the source communication network from the source end point device, to generate encrypted versions of the packets received by the cloud service connector located in the source communication network from the source end point device;
tunneling the encrypted versions of the packets received by the cloud service connector located in the source communication network to the cloud service through the connections established between the cloud service connector located in the source communication network and the cloud service;
decrypting, by the cloud service connector located in the destination communication network, packets tunneled to the cloud service connector located in the destination communication network from the cloud service;
performing data encryption, by the cloud service connector located in the destination communication network on packets received by the cloud service connector located in the destination communication network from the destination end point device, to generate encrypted versions of the packets received by the cloud service connector located in the destination communication network from the destination end point device;
tunneling the encrypted versions of the packets received by the cloud service connector located in the destination communication network to the cloud service through the connections established between the cloud service connector located in the destination communication network and the cloud service; and
decrypting, by the cloud service connector located in the source communication network, packets tunneled to the cloud service connector located in the source communication network from the cloud service.

7. The method of claim 4, further comprising:
performing data compression, by the cloud service connector located in the source communication network on packets received by the cloud service connector located in the source communication network from the source end point device, to generate compressed versions of the packets received by the cloud service connector located in the source communication network from the source end point device;

performing data encryption, by the cloud service connector located in the source communication network on the compressed versions of the packets received by the cloud service connector located in the source communication network from the source end point device, to generate compressed and encrypted versions of the packets received by the cloud service connector located in the source communication network from the source end point device;

tunneling the compressed and encrypted versions of the packets received by the cloud service connector located in the source communication network to the cloud service through the connections established between the cloud service connector located in the source communication network and the cloud service;

decrypting and decompressing, by the cloud service connector located in the destination communication network, packets tunneled to the cloud service connector located in the destination communication network from the cloud service;

performing data compression, by the cloud service connector located in the destination communication network on packets received by the cloud service connector located in the destination communication network from the destination end point device, to generate compressed versions of the packets received by the cloud service connector located in the destination communication network from the destination end point device;

performing data encryption, by the cloud service connector located in the destination communication network on the compressed versions of the packets received by the cloud service connector located in the destination communication network from the destination end point device, to generate compressed and encrypted versions of the packets received by the cloud service connector located in the destination communication network from the destination end point device;

tunneling the compressed and encrypted versions of the packets received by the cloud service connector located in the destination communication network to the cloud service through the connections established between the cloud service connector located in the destination communication network and the cloud service; and decrypting and decompressing, by the cloud service connector located in the source communication network, packets tunneled to the cloud service connector located in the source communication network from the cloud service.

8. The method of claim 1, wherein tunneling packets over connections between the cloud service connector located in the source communication network and the cloud service includes encapsulating, by the cloud service connector located in the source communication network, packets received by the cloud service connector located in the source communication network from the source end point device, into the data portions of packets transmitted from the cloud service connector located in the source communication network to the cloud service over the connections established between the cloud service connector located in the source communication network and the cloud service; and wherein tunneling packets over connections between the cloud service and the cloud service connector located in the destination communication network includes encapsulating, by the cloud service connector located in the destination communication network, packets received by the cloud service connector located in the destination communication network from the destination end point device, into the data portions of packets transmitted from the cloud service connector located in the destination communication network to the cloud service over the connections established between the cloud service and the cloud service connector located in the destination communication network.

9. A system for providing communication connectivity between network devices that are located in isolated communication networks through a centralized cloud service, comprising:

at least one source server located in a source communication network, wherein the source server includes memory that stores program code for execution on processing circuitry of the source server, and wherein the program code stored in the memory of the source server includes a cloud service connector located in the source communication network;

at least one cloud server computer located in a public communication network that is communicably connected to the source communication network, wherein the cloud server computer includes memory that stores program code for execution on processing circuitry of the cloud server computer, and wherein the program code stored in the memory of the source server includes a cloud service;

wherein the cloud service connector located in the source communication network is configured and arranged to:
  receive, from a source end point device located in the source communication network and that is separate and independent from the cloud service connector, an initial connection request message, wherein the initial connection request message requests a connection on a port number that is contained in the initial connection request,
  retrieve, in response to receipt of the initial connection request message and based on the port number contained in the initial connection request message, both i) a customer name that corresponds to a destination communication network, and ii) an indication of a requested service, at least in part by using the port number contained in the initial connection request message as an index into a lookup table contained in the cloud service connector to cause the lookup table to return an entry in the lookup table corresponding to the port number and containing the customer name and the indication of the requested service, wherein the retrieved customer name and indication of the requested service name each correspond to the port number contained in the initial connection request,
  create, using the customer name and the indication of the requested service, a tunnel connection request message, wherein the tunnel connection request message contains the customer name and the indication of the requested service, and
  transmit the tunnel connection request message to the cloud service located in a public communication network that is communicably connected to the source communication network; and wherein the cloud service is configured and arranged to:
  receive the tunnel connection request message, extract, in response to receipt of the tunnel connection request message, the customer name and the indication of the requested service from the tunnel connection request message, retrieve, further in response to receipt of the tunnel connection request message, and in response to the customer name and the indication of the requested service extracted from the tunnel connection request message, i) an identifier of a cloud service connector located in the destination communication network that corresponds to the customer name extracted from the tunnel connection request, and ii) an identifier of a destination end point device located in the destination communication network that provides the requested service, wherein the destination communication network is also communicably connected to the public communication network, and wherein network traffic on the destination communication network is isolated from network traffic on the source communication network, and convey network traffic between the source end point device and the destination end point device through the cloud service by tunneling packets over connections i) between the cloud service connector located in the source communication network and the cloud service and ii) between the cloud service and the cloud service connector located in the destination communication network.

10. The system of claim 9, wherein the cloud service is further configured and arranged to i) receive one or more configuration management messages, wherein the configuration management messages include an access control list for the source end point device and an access control list for the destination end point device, and ii) store the access control list for the source end point device and the access control list for the destination end point device into a connection permissions database in the cloud service; and wherein to convey the network traffic between the source end point device and the destination end point device through the cloud service the cloud service is further configured and arranged to:
  i) determine, from the connection permissions database, whether the access control list for the source end point device contains an identifier of the destination end point device,
  ii) determine, from the connection permissions database, whether the access control list for the destination end point device contains an identifier of the source end point device, and
  iii) convey the network traffic between the source end point device and the destination end point device in response to determining that the access control list for the source end point device contains an identifier of the destination end point device and that the access control list for the destination end point device contains an identifier of the source end point device.

11. The system of claim 9, wherein the cloud service is further configured and arranged to:

establish multiple connections between the cloud service connector located in the source communication network and the cloud service to provide fault tolerance and load balancing between the cloud service connector located in the source communication network and the cloud service; and establish multiple connections between the cloud service and the cloud service connector located in the destination communication network to provide fault tolerance and load balancing between the cloud service and the cloud service connector located in the destination communication network.

12. The system of claim 11, wherein the cloud service is further configured and arranged to create an entry in a connection routing table that is contained in the cloud service, wherein the entry created in the connection routing table maps i) the connections established between the cloud service connector located in the source communication network and the cloud service, to ii) the connections established between the cloud service and the cloud service connector located in the destination communication network; and wherein to process packets tunneled to the cloud service, the cloud service is further configured and arranged to, responsive to the entry created in the connection routing table that maps i) the connections established between the cloud service connector located in the source communication network and the cloud service, to ii) the connections established between the cloud service and the cloud service connector located in the destination communication network:

tunnel packets that are tunneled to the cloud service on the connections established between the cloud service connector located in the source communication network and the cloud service onto the connections established between the cloud service and the cloud service connector located in the destination communication network, and tunnel packets that are tunneled to the cloud service on the connections established between the cloud service and the cloud service connector located in the destination communication network onto the connections established between the cloud service connector located in the source communication network and the cloud service.

13. The system of claim 12, further comprising:

wherein the cloud service connector located in the source communication network is further configured and arranged to:

perform data compression on packets received by the cloud service connector located in the source communication network from the source end point device, to generate compressed versions of the packets received by the cloud service connector located in the source communication network from the source end point device, and tunnel the compressed versions of the packets received by the cloud service connector located in the source communication network to the cloud service through the connections established between the cloud service connector located in the source communication network and the cloud service;

wherein the cloud service connector located in the destination communication network is further configured and arranged to:

decompress packets tunneled to the cloud service connector located in the destination communication network from the cloud service, performing data compression on packets received by the cloud service connector located in the destination communication network from the destination end point device, to generate compressed versions of the packets received by the cloud service connector located in the destination communication network from the destination end point device, and tunnel the compressed versions of the packets received by the cloud service connector located in the destination communication network to the cloud service through the connections established between the cloud service connector located in the destination communication network and the cloud service; and wherein the cloud service connector located in the source communication network is further configured and arranged to:

decompress packets tunneled to the cloud service connector located in the source communication network from the cloud service.

14. The system of claim 13, further comprising:
wherein the cloud service connector located in the source communication network is further configured and arranged to:
perform data encryption on packets received by the cloud service connector located in the source communication network from the source end point device, to generate encrypted versions of the packets received by the cloud service connector located in the source communication network from the source end point device, and
tunnel the encrypted versions of the packets received by the cloud service connector located in the source communication network to the cloud service through the connections established between the cloud service connector located in the source communication network and the cloud service;

wherein the cloud service connector located in the destination communication network is further configured and arranged to:
decrypt packets tunneled to the cloud service connector located in the destination communication network from the cloud service,
perform data encryption on packets received by the cloud service connector located in the destination communication network from the destination end point device, to generate encrypted versions of the packets received by the cloud service connector located in the destination communication network from the destination end point device, and
tunnel the encrypted versions of the packets received by the cloud service connector located in the destination communication network to the cloud service through the connections established between the cloud service connector located in the destination communication network and the cloud service; and wherein the cloud service connector located in the source communication network is further configured and arranged to:
decrypt packets tunneled to the cloud service connector located in the source communication network from the cloud service.

15. The system of claim 12, further comprising:
wherein the cloud service connector located in the source communication network is further configured and arranged to:
perform data compression on packets received by the cloud service connector located in the source communication network from the source end point device, to generate compressed versions of the packets received by the cloud service connector located in the source communication network from the source end point device,
perform data encryption on the compressed versions of the packets received by the cloud service connector located in the source communication network from the source end point device, to generate compressed and encrypted versions of the packets received by the cloud service connector located in the source communication network from the source end point device, and
tunnel the compressed and encrypted versions of the packets received by the cloud service connector located in the source communication network to the cloud service through the connections established between the cloud service connector located in the source communication network and the cloud service;

wherein the cloud service connector located in the destination communication network is further configured and arranged to:
decrypt and decompress packets tunneled to the cloud service connector located in the destination communication network from the cloud service,
perform data compression on packets received by the cloud service connector located in the destination communication network from the destination end point device, to generate compressed versions of the packets received by the cloud service connector located in the destination communication network from the destination end point device,
perform data encryption on the compressed versions of the packets received by the cloud service connector located in the destination communication network from the destination end point device, to generate compressed and encrypted versions of the packets received by the cloud service connector located in the destination communication network from the destination end point device, and
tunnel the compressed and encrypted versions of the packets received by the cloud service connector located in the destination communication network to the cloud service through the connections established between the cloud service connector located in the destination communication network and the cloud service; and wherein the cloud service connector located in the source communication network is further configured and arranged to:
decrypt and decompress packets tunneled to the cloud service connector located in the source communication network from the cloud service.

16. The system of claim 9, further comprising:
wherein to tunnel packets over connections between the cloud service connector located in the source communication network and the cloud service the cloud service connector located in the source communication network is further configured and arranged to encapsulate packets received by the cloud service connector located in the source communication network from the source end point device into the data portions of packets transmitted from the cloud service connector located in the source communication network to the cloud service over the connections established between the cloud service connector located in the source communication network and the cloud service; and wherein to tunnel packets over connections between the cloud service and the cloud service connector located in the destination communication network the cloud service connector located in the destination communication network is further configured and arranged to encapsulate packets received by the cloud service connector located in the destination communication network from the destination end point device into the data portions of packets transmitted from the cloud service connector located in the destination communication network to the cloud service over the connections established between the cloud service and the cloud service connector located in the destination communication network.

17. A non-transitory computer readable medium storing program code for providing communication connectivity between network devices that are located in isolated communication networks through a centralized cloud service, wherein the program code, when executed by processing circuitry, causes the processing circuitry to perform a method of:

receiving, from a source end point device located in a source communication network, by a cloud service connector located in the source communication network, an initial connection request message, wherein the initial connection request message requests a connection on a port number that is contained in the initial connection request, and wherein the cloud service connector is separate and independent from the source end point device;

retrieving, by the cloud service connector located in the source communication network, in response to receipt of the initial connection request message and based on the port number contained in the initial connection request message, both i) a customer name that corresponds to a destination communication network, and ii) an indication of a requested service, at least in part by using the port number contained in the initial connection request message as an index into a lookup table contained in the cloud service connector to cause the lookup table to return an entry in the lookup table corresponding to the port number and containing the customer name and the indication of the requested service, wherein the retrieved customer name and indication of the requested service name each correspond to the port number contained in the initial connection request;

creating, by the cloud service connector located in the source communication network using the customer name and the indication of the requested service, a tunnel connection request message, wherein the tunnel connection request message contains the customer name and the indication of the requested service;

transmitting the tunnel connection request message, by the cloud service connector located in the source communication network, to a cloud service located in a public communication network that is communicably connected to the source communication network;

receiving the tunnel connection request message by the cloud service;

extracting, by the cloud service in response to receipt of the tunnel connection request message, the customer name and the indication of the requested service from the tunnel connection request message;

retrieving, by the cloud service further in response to receipt of the tunnel connection request message, and in response to the customer name and the indication of the requested service extracted from the tunnel connection request message, i) an identifier of a cloud service connector located in the destination communication network that corresponds to the customer name extracted from the tunnel connection request, and ii) an identifier of a destination end point device located in the destination communication network that provides the requested service, wherein the destination communication network is also communicably connected to the public communication network, and wherein network traffic on the destination communication network is isolated from network traffic on the source communication network; and conveying network traffic between the source end point device and the destination end point device through the cloud service by tunneling packets over connections i) between the cloud service connector located in the source communication network and the cloud service and ii) between the cloud service and the cloud service connector located in the destination communication network.

* * * * *